(12) United States Patent
Bergmann et al.

(10) Patent No.: US 6,834,069 B1
(45) Date of Patent: Dec. 21, 2004

(54) MOLECULAR FLUORINE LASER WITH INTRACAVITY POLARIZATION ENHANCER

(75) Inventors: Elko Bergmann, Goettingen (DE); Frank Voss, Bad Gandersheim (DE); Klaus Wolfgang Vogler, Goettingen (DE)

(73) Assignee: Lambda Physik AG, Goettingen (DE)

( * ) Notice: Subject to any disclaimer, the term of this patent is extended or adjusted under 35 U.S.C. 154(b) by 0 days.

(21) Appl. No.: 10/162,115

(22) Filed: Jun. 3, 2002

Related U.S. Application Data

(63) Continuation-in-part of application No. 09/738,849, filed on Dec. 15, 2000, now Pat. No. 6,678,291.
(60) Provisional application No. 60/296,898, filed on Jun. 7, 2001, provisional application No. 60/173,993, filed on Dec. 30, 1999, and provisional application No. 60/170,919, filed on Dec. 15, 1999.

(51) Int. Cl.[7] .............................................. H01S 3/223
(52) U.S. Cl. .......................................... 372/57; 372/58
(58) Field of Search ............................ 372/32, 57, 55, 372/58, 29.011, 20, 108, 100

(56) References Cited

U.S. PATENT DOCUMENTS

| | | | | |
|---|---|---|---|---|
| 5,898,725 A | | 4/1999 | Fomenkov et al. | 372/102 |
| 6,028,879 A | * | 2/2000 | Ershov | 372/57 |
| 6,128,323 A | * | 10/2000 | Myers et al. | 372/38.1 |
| 6,137,821 A | * | 10/2000 | Ershov | 372/108 |
| 6,154,470 A | | 11/2000 | Basting et al. | 372/19 |
| 6,163,559 A | * | 12/2000 | Watson | 372/102 |
| 6,188,709 B1 | * | 2/2001 | Webb | 372/57 |
| 6,192,064 B1 | * | 2/2001 | Algots et al. | 372/99 |
| 6,240,110 B1 | * | 5/2001 | Ershov | 372/20 |

(List continued on next page.)

FOREIGN PATENT DOCUMENTS

| | | | |
|---|---|---|---|
| WO | WO 01/29939 | 4/2001 | H01S/3/03 |
| WO | WO 02/099938 | 12/2002 | H01S/3/10 |

OTHER PUBLICATIONS

In re provisional application of Jurgen Kleinschmidt et al., application No. 60/170,919 filed Dec. 15, 1999, entitled "Line Selection Using a Grism Output Coupler", 13 pages of specification.

In re application of Klaus Vogler, application No. 09/512,417 filed Feb. 24, 2000, entitled "Energy Monitor for $F_2$ Molecular Fluorine Laser and Method of Energy Stabilization", 11 pages of specification, 4 pages of drawings.

In re application of Klaus Vogler et al., application No. 09/771,013 filed Jan. 25, 2001, entitled "Energy Monitor for Molecular Fluorine Laser", 36 pages of specification, 16 pages of drawings.

In re provisional application of Frank Voss et al., application No. 60/126,435 filed Aug. 18, 1998, entitled "$F_2$ Laser Resonator with Intracavity Line Selection", 17 pages of specification, 2 pages of drawings.

*Primary Examiner*—Minsun Oh Harvey
*Assistant Examiner*—Tuan N. Nguyen
(74) *Attorney, Agent, or Firm*—Stallman & Pollock LLP

(57) ABSTRACT

A $F_2$ laser includes a laser tube filled with a laser gas mixture at least including molecular fluorine for generating a spectral emission including multiple closely-spaced lines in a wavelength range between 157 nm and 158 nm, including a first line centered around 157.62 nm and a second line centered around 157.52 nm, multiple electrodes within the discharge chamber connected with a power supply circuit for energizing the molecular fluorine, a laser resonator including a line selection unit for selecting one of the first and second lines of the multiple closely spaced lines and for supressing the other of the first and second lines, for generating a narrow bandwidth VUV output beam, and at least one intracavity polarizing element. The narrow bandwidth VUV output beam is polarized at least 95%, and may be 98% or more.

56 Claims, 14 Drawing Sheets

U.S. PATENT DOCUMENTS

| | | | |
|---|---|---|---|
| 6,330,260 B1 * | 12/2001 | Onkels et al. | 372/38.04 |
| 6,381,257 B1 * | 4/2002 | Ershov et al. | 372/57 |
| 6,496,528 B2 * | 12/2002 | Titus et al. | 372/102 |
| 6,529,533 B1 | 3/2003 | Voss | 372/29.01 |
| 6,556,613 B2 | 4/2003 | Kleinschmidt et al. | 372/103 |
| 6,577,665 B2 | 6/2003 | Vogler et al. | 372/58 |
| 6,590,922 B2 | 7/2003 | Onkels et al. | 372/57 |
| 6,603,788 B1 * | 8/2003 | Vogler et al. | 372/57 |
| 6,614,828 B1 * | 9/2003 | Basting et al. | 372/100 |
| 2002/0018506 A1 | 2/2002 | Vogler | 372/55 |

* cited by examiner

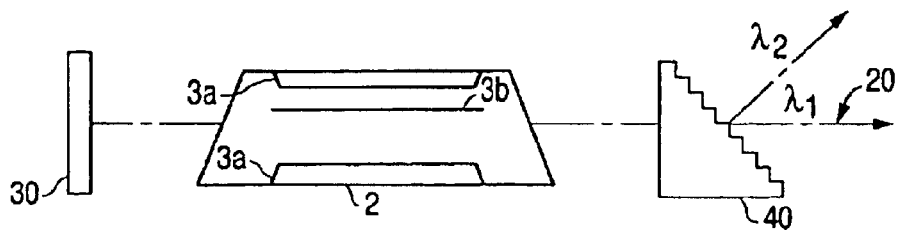
FIG. 4b
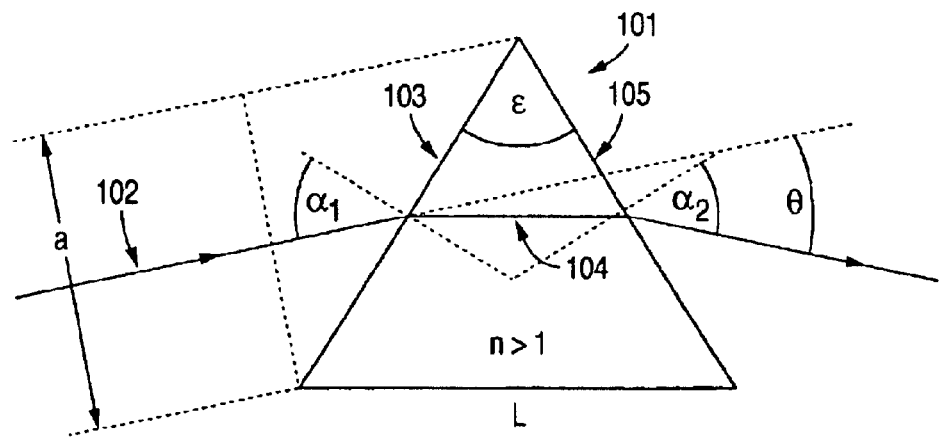
FIG. 5
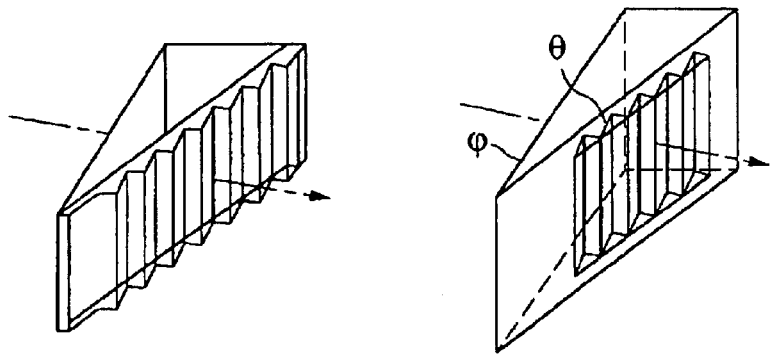
FIG. 6a  FIG. 6b

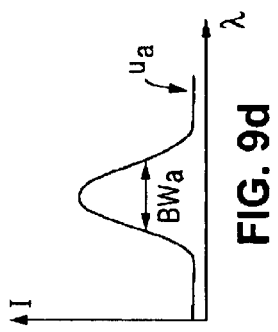
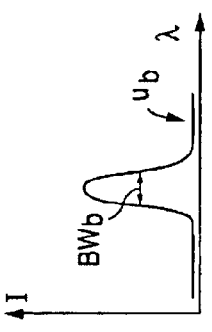
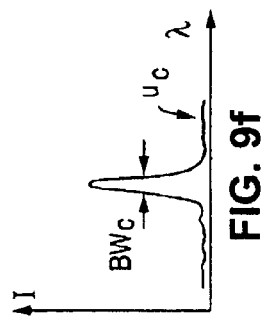
FIG. 9d
FIG. 9e
FIG. 9f
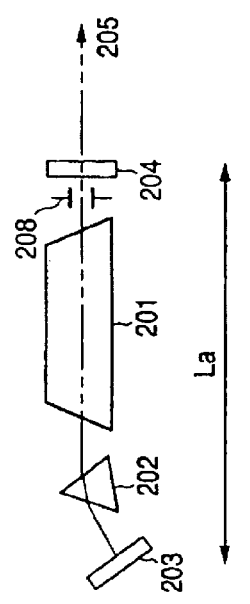
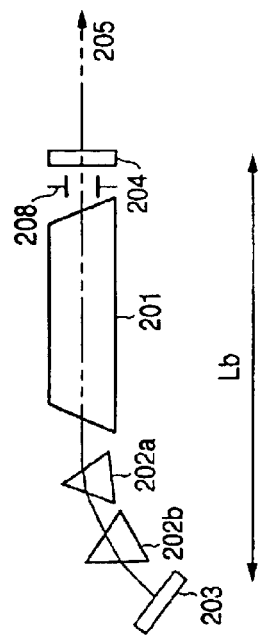
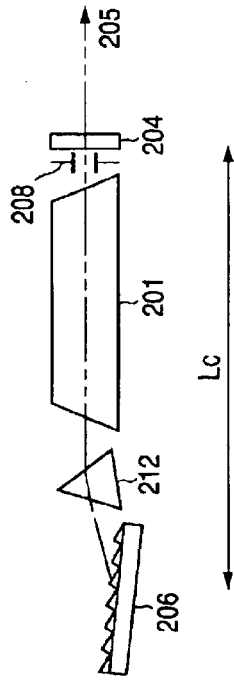
FIG. 9a
FIG. 9b
FIG. 9c

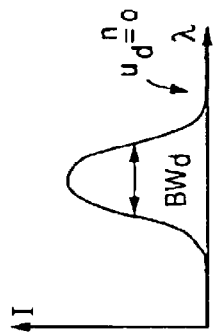
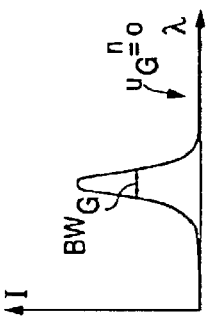
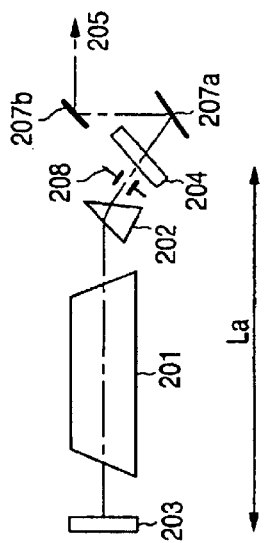
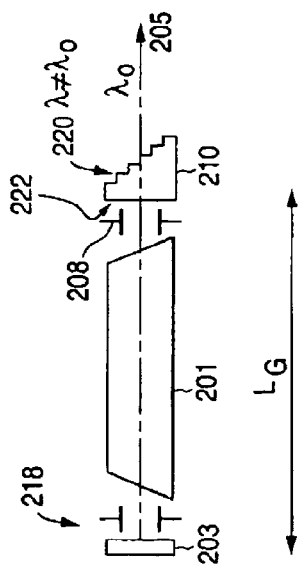
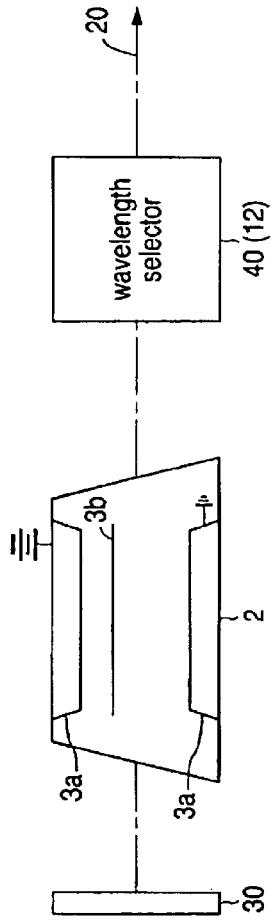
FIG. 9g  FIG. 10a  FIG. 11

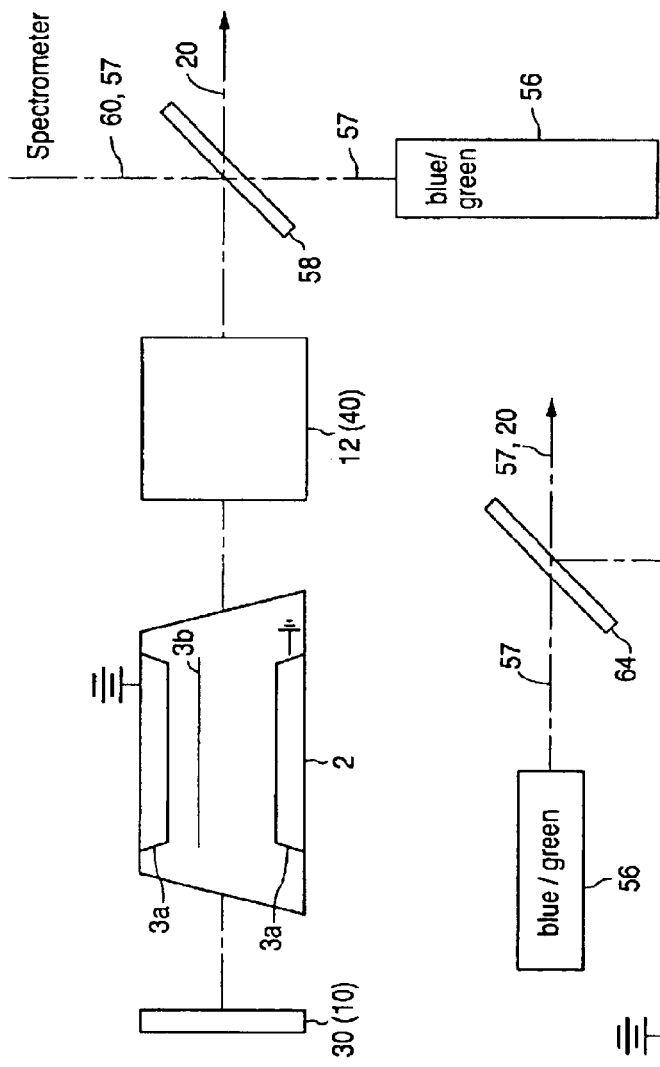
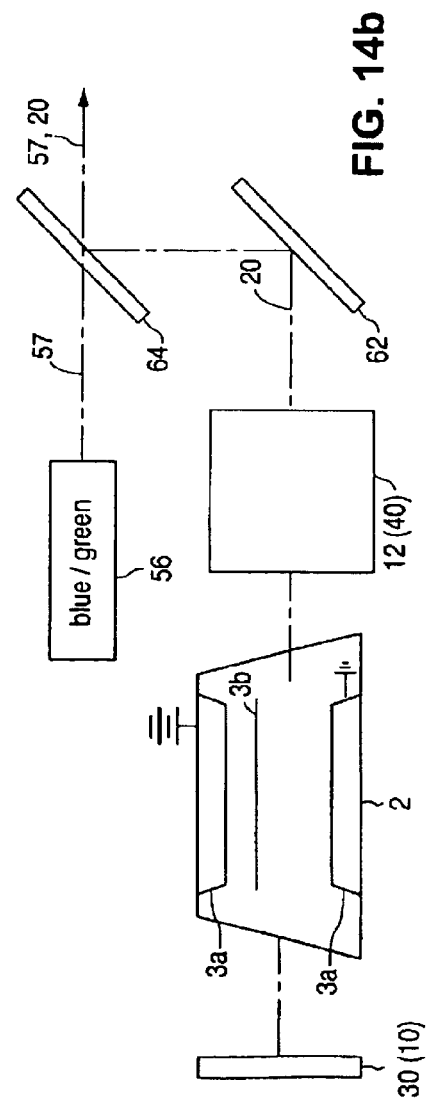
FIG. 14a
FIG. 14b

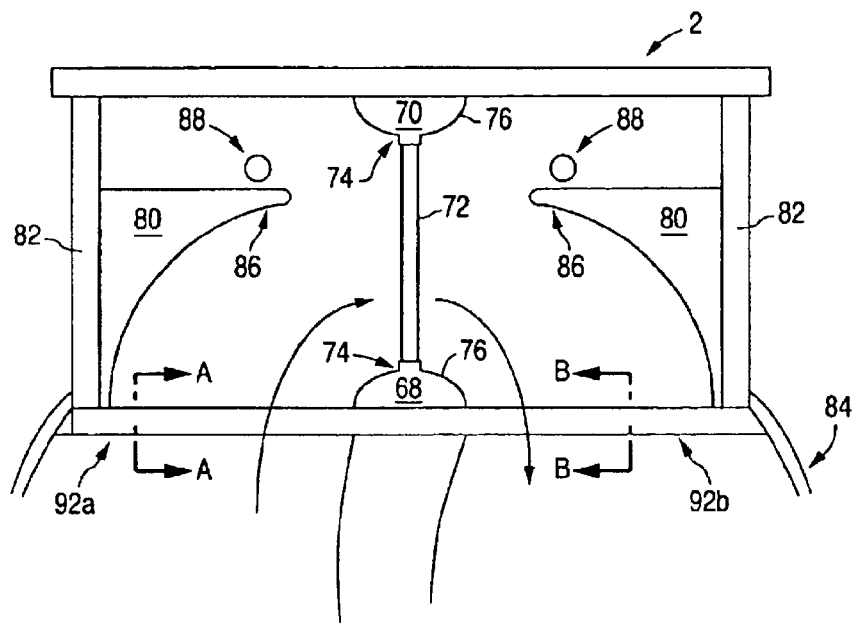
FIG. 15a
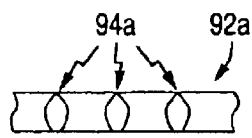 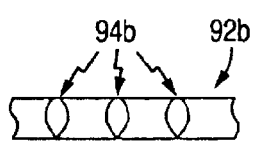
FIG. 15b  FIG. 15c
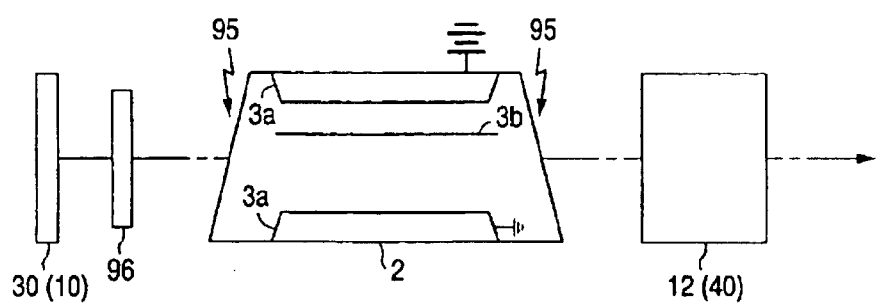
FIG. 16a

MOLECULAR FLUORINE LASER WITH INTRACAVITY POLARIZATION ENHANCER

PRIORITY

This application claims the benefit of priority to U.S. provisional patent application No. 60/296,898, filed Jun. 7, 2001, and this application is a Continuation-in-Part application of U.S. patent application Ser. No. 09/738,849, filed Dec. 15, 2000 now U.S. Pat. No. 6,678,291, which claims the benefit of priority to U.S. provisional applications No. 60/173,993, filed Dec. 30, 1999, and 60/170,919, filed Dec. 15, 1999.

BACKGROUND OF THE INVENTION

1. Field of the Invention

The invention relates to a molecular fluorine ($F_2$) laser, and particularly to an $F_2$-laser with an improved resonator design and improved beam monitoring and line-selection for providing stable output beam parameters at high operating repetition rates.

2. Discussion of the Related Art a. VUV Microlithography

Semiconductor manufacturers are currently using deep ultraviolet (DUV) lithography tools based on KrF-excimer laser systems operating around 248 nm, as well as the following generation of ArF-excimer laser systems operating around 193 nm. Vacuum UV (VUV) will use the $F_2$-laser operating around 157 nm.

The construction and electrical excitation of the $F_2$-laser differs fundamentally from the rare gas-halide excimer lasers mentioned above. The laser gas of a rare gas-halide excimer laser, such as the KrF or ArF laser, includes a laser active molecular species that has no bound ground state, or at most a weakly bound ground state. The laser active gas molecule of the excimer laser dissociates into its constituent atomic components upon optical transition from an upper metastable state to a lower energy state. In contrast, the laser active gas constituent molecule ($F_2$) of the $F_2$-laser responsible for the emission around 157 nm is bound and stable in the ground state. In this case, the $F_2$ molecule does not dissociate after making its optical transition from the upper to the lower state.

The $F_2$-laser has an advantageous output emission spectrum including one or more lines around 157 nm. This short wavelength is advantageous for photolithography applications because the critical dimension (CD), which represents the smallest resolvable feature size producible using photolithography, is proportional to the wavelength. This permits smaller and faster microprocessors and larger capacity DRAMs in a smaller package. The high photon energy (i.e., 7.9 eV) is also readily absorbed in high band gap materials like quartz, synthetic quartz ($SiO_2$), Teflon (PTFE), and silicone, among others, such that the $F_2$-laser has great potential in a wide variety of materials processing applications. It is desired to have an efficient $F_2$ laser for these and other industrial, commercial and scientific applications.

b. Line-Selection And Line-Narrowing

The emission of the $F_2$-laser includes at least two characteristic lines around $\lambda_1$, =157.629 nm and $\lambda_2$=157.523 nm. Each line has a natural linewidth of less than 15 pm (0.015 nm), and in the usual pressure range between 24 bar, the natural linewidth can be less than 2 pm. The intensity ratio between the two lines is $|(\lambda_1)/(\lambda_2)|=\approx 7$. See V. N. Ishenko, S. A. Kochubel, and A. M. Razher, Sov. Journ. QE-16, 5(1986).

FIGS. 1a and 1b illustrate the two above-described closely-spaced peaks of the $F_2$-laser spontaneous emission spectrum. FIG. 1b shows a third $F_2$ laser emission line around 157 nm that is observed when neon is used as a buffer gas, but that is not observed when the buffer gas used is strictly helium, as shown in FIG. 1a (see U.S. Pat. No. 6,157,662, which is hereby incorporated by reference). Either way, the characteristic bandwidth of the 157 nm emission of the $F_2$ laser is effectively more than 100 pm due to the existence of the multiple lines.

Integrated circuit device technology has entered the sub-0.18 micron regime, thus necessitating very fine photolithographic techniques. Line narrowing and tuning is required in KrF- and ArF-excimer laser systems due to the breadth of their natural emission spectra (around 400 pm). Narrowing of the linewidth is achieved most commonly through the use of a line-narrowing unit consisting of one or more prisms and a diffraction grating known as a "Littrow configuration". However, for an $F_2$-laser operating at a wavelength of approximately 157 nm, use of a reflective diffraction grating may be unsatisfactory because a typical reflective grating exhibits low reflectivity and a laser employing such a grating has a high oscillation threshold at this wavelength (although an oscillator-amplifier configuration may be used to boost the power of an oscillator including a grating as described in U.S. patent application Ser. No. 09/599,130, which is assigned to the same assignee as the present application and is hereby incorporated by reference). The selection of a single line of the $F_2$ laser output emission around 157 nm has been advantageously achieved and described at U.S. patent application Ser. No. 09/317,695 and U.S. Pat. No. 6,154,470, which are assigned to the same assignee as the present application and are hereby incorporated by reference. It is desired to improve upon the line-selection techniques set forth in the '695 application and the '470 patent. Moreover, it is desired to have a way of monitoring the quality of the line selection being performed.

For an excimer laser, such as a KrF- or ArF-excimer laser, the characteristic emission spectrum may be as broad as 400 pm. To narrow the output bandwidth, one or more dispersive line-narrowing optics are inserted into the resonator. To increase the angular (and spectral) resolution commonly more than one optical dispersive element is introduced. A typical line-narrowing arrangement for a KrF- or ArF-excimer laser includes a multiple prism beam expander before a grating in Littrow configuration.

c. Absorption

The $F_2$-laser has been known since around 1977 [see, e.g., Rice et al., VUV Emissions from Mixtures of $F_2$ and the Noble Gases-A Molecular $F_2$ laser at 1575 angstroms, Applied Physics Letters, Vol. 31, No. 1, 1 July 1977, which is hereby incorporated by reference]. However, previous $F_2$-lasers have been known to exhibit relatively low gains and short gas lifetimes. Other parameters such as the pulse-to-pulse stabilities and laser tube lifetimes have been unsatisfactory. In addition, oxygen and water exhibit high absorption cross sections around the desired 157 nm emission line of the $F_2$-laser, further reducing overall efficiency at the wafer when encountered by the laser beam anywhere along its path. To prevent this absorption, one can maintain a purged or evacuated beam path for the $F_2$-laser free of oxygen, hydrocarbons and water (see U.S. Pat. No. 6,219,368, which is hereby incorporated by reference). In short, despite the desirability of using short emission wavelengths for photolithography, $F_2$-lasers have seen very little practical industrial application to date. It is desired to have an $F_2$-laser with enhanced gain, longer pulse lengths, enhanced energy stability, and increased lifetime.

$F_2$-lasers are also characterized by relatively high intracavity losses, due to absorption and scattering in gases and optical elements within the laser resonator, particularly again in oxygen and water vapor which absorb strongly around 157 nm. The short wavelength (157 nm) is responsible for the high absorption and scattering losses of the $F_2$-laser, whereas the KrF-excimer laser operating at 248 nm does not experience losses of such a comparably high degree. In addition, output beam characteristics are more sensitive to temperature induced variations effecting the production of smaller structures lithographically at 157 nm, than those for longer wavelength lithography such as at 248 nm and 193 nm.

d. Atomic Fluorine Visible Emission

The VUV laser radiation around 157 nm of the $F_2$-molecule has been observed as being accompanied by further laser radiation output in the red region of the visible spectrum, i.e., from 630–780 nm. This visible light originates from the excited fluorine atom (atomic transition). It is desired to have an $F_2$-laser wherein the output in the visible region is minimized and also to maximize the energy in the VUV region.

Although the active constituent in the gas mixture of the $F_2$-laser is fluorine, the amount of pure fluorine amounts to no more than about 5 to 10 mbar of partial pressure within the gas mixture, and typically less than 5 mbar. A higher overall pressure is needed to sustain a uniform discharge. Consequently, a buffer gas is used to raise the discharge vessel pressure, typically to well above atmospheric pressure (e.g., 2–10 bars), in order to achieve an efficient excitation within the discharge and realize an efficient output of the 157 nm radiation.

For this reason, $F_2$-lasers have gas mixtures including an inert buffer gas which is typically helium and/or neon. When helium is used, however, the output in the red visible region can range from one to more than three percent of the VUV emission. In addition, the VUV pulse lengths tend to be relatively short. The visible output of the $F_2$ laser has been advantageously reduced by using neon or a combination of neon and helium as the buffer gas in the $F_2$ laser (see the '662 patent). In addition, the length of the VUV output pulses of the $F_2$ laser has been shown in the '662 patent to be increased using neon in the gas mixture improving both line selection and line narrowing capability. It is desired to further reduce the influence of the visible emission on the performance of the $F_2$ laser.

e. relatively short pulse duration

As noted above, the pulse duration of the $F_2$ laser is relatively short compared with that of the rare gas-halide excimer lasers. For example, KrF laser pulses make between four and six roundtrips through the laser resonator, whereas $F_2$ laser pulses typically make only one to two roundtrips. This reduces the effectiveness of the line-selection and narrowing components of the resonator. The short pulse duration also reduces the polarizing influence of surfaces aligned at Brewster's angle such as the windows on the laser tube or of other polarizing components in the resonator. The pulse duration is advantageously increased as described in the '662 patent using neon in the gas mixture. A comparison of the $F_2$ laser emission linewidths in FIG. 1a with those shown at FIG. 1b illustrate the effect of increasing the pulse duration by substituting neon for helium in the gas mixture. However, when the laser tube windows are aligned at Brewster's angle, the output laser beam is still only about 70% polarized. It is desired to have a $F_2$ laser which emits a substantially polarized beam, e.g., such that the beam exhibits a 95% or greater polarization.

f. Beam Parameter and Alignment Monitoring

It is desired that the pulse energy, wavelength and bandwidth of the output beam each be stabilized at specified values, particularly for photolithography lasers. Moreover, it is desired to maintain a substantially constant energy dose at the workpiece. Further, it is desired to maintain a steady and predetermined beam alignment. Various techniques are known for monitoring the pulse energy and/or other beam parameters and controlling the discharge voltage, the composition of gases in the laser tube and/or the hardware and optics for stabilizing these parameters in photolithography lasers (see U.S. patent applications Ser. No. 09/447,882, 09/734,459, 09/418,052, 09/688,561, 09/416,344, 09/484,818 and 09/513,025 and U.S. Pat. No. 6,212,214, which are assigned to the same assignee as the present application and are hereby incorporated by reference). Beam alignment techniques are described at U.S. Pat. Nos. 6,014,206, 6,160,831 and 5,373,515, which are hereby incorporated by reference. The visible emission of the $F_2$ laser and the tendency of the VUV emission of the $F_2$ laser to undergo absorption present some difficulties. It is therefore desired to effectively implement beam alignment, polarization and parameter monitoring techniques in a $F_2$ laser system.

It is desired to have an efficient $F_2$ laser for industrial, commercial and/or scientific applications such as photolithography and other materials processing applications.

It is also desired to have a $F_2$ laser that emits a substantially polarized beam, e.g., such that the beam exhibits a 95% or greater polarization.

It is further desired to have resonator optics alignment and polarization monitoring techniques in a $F_2$ laser system.

It is further desired to have an inert gas purged optics module having improved gas flow homogeneity through the interior of the optics module.

SUMMARY OF THE INVENTION

In accordance with the above, a $F_2$ laser is provided including a laser tube filled with a laser gas mixture and having a plurality of electrodes connected with a power supply circuit for energizing the gas mixture. A laser resonator for generating a narrow bandwidth VUV output beam includes a line selection unit for selecting one of multiple closely-spaced characteristic emission lines around 157 nm.

A $F_2$ laser is further provided with at least one intracavity polarizing element so that a significantly polarized output beam is generated. The polarization is preferably provided by one or more, and more preferably two or more, intracavity Brewster plates. Further polarization is preferably provided by having Brewster windows sealing the laser tube. Still further polarization may occur at entrance and/or exit faces of a prism of the line selection unit. Polarization may also be provided by a thin film polarizer or a double reflection prism. The polarization of an output beam of the laser is advantageously 95% or better, and may be 98% or more, if desired.

A probe beam analyzing system for monitoring the polarization and/or the alignment of optics of the laser resonator is also provided. The probe beam analyzing system includes a probe beam laser source and detector. A laser beam emitted from the probe beam source traverses components of the laser resonator and is detected by a polarization detector, a photodiode detector for measuring probe beam intensity, a position sensitive detector or psd for monitoring beam alignment, and/or a diode array for monitoring beam profile.

The probe beam is preferably a blue or green reference beam (e.g., having a wavelength between 400 nm and 600 nm). The blue or green reference beam advantageously is not reflected out with the red atomic fluorine emission of the laser and is easily resolved from the red emission.

An optics module, as well as preferably all intracavity and extracavity beam paths, of an excimer or molecular fluorine laser is preferably either purged with an inert gas, or evacuated to low pressure, or both. The optics module may have multiple gas flow capillary inlets for the inert gas to homogenize the gas within the optics module. A heater and optional temperature controller may be used for regulating the temperature within the module at a substantially constant selected temperature.

BRIEF DESCRIPTION OF THE DRAWINGS

FIG. 4b schematically shows a $F_2$ laser resonator including a grism as an output coupler also in accord with a preferred embodiment.

FIG. 5 illustrates angular dispersion by an ordinary prism.

FIG. 6a illustrates a grism including a prism with an attached grating.

FIG. 6b illustrates a grism including a prism having a grating etched into the prism material.

FIGS. 9a–9c and 9g show alternative line-narrowing resonator configurations.

FIGS. 9d–9f and 9h illustrate spectral distributions and background radiation levels of output beams of the resonator configurations of FIGS. 9a–9c and 9g.

FIG. 10a shows a resonator including a grism output coupler.

FIG. 10b illustrates a spectral distribution and zero background radiation level of an output beam of the resonator configuration of FIG. 10a.

FIG. 11 schematically shows a $F_2$ laser resonator having line selection fully performed at the front optics module of the resonator in accord with a preferred embodiment.

FIG. 14a shows a $F_2$ laser system including a blue or green reference beam for wavelength calibration in accord with a preferred embodiment.

FIG. 14b shows a $F_2$ laser system including a blue or green reference beam for beam alignment stabilization accord with a preferred embodiment.

FIG. 15a shows a discharge chamber for a $F_2$ laser in accord with a preferred embodiment.

FIG. 15b shows a cross sectional view of the ribs crossing the gas flow of the laser tube of FIG. 15a where the gas flows into the discharge chamber from the gas flow vessel, wherein the ribs are separated by openings to permit the gas flow and aerodynamically shaped to provide more uniform gas flow and the ribs further serve as low inductivity current return bars.

FIG. 15c shows a cross sectional view of the ribs crossing the gas flow of FIG. 15a separated by openings to permit gas flow from the discharge chamber back into the gas flow vessel, wherein the ribs are aerodynamically shaped and separated by openings through which gas exits the discharge chamber and flows back into the gas flow vessel.

FIG. 16a shows a $F_2$ laser resonator, particularly having Brewster windows on the discharge tube, for providing a polarized output beam in accord with a preferred embodiment.

Incorporation by Reference

What follows is a cite list of references each of which is, in addition to those references cited above and below, and including that which is described in the related art description, and the above invention summary, and the abstract, are hereby incorporated by reference into the detailed description of the preferred embodiment below, as disclosing alternative embodiments of elements or features of the preferred embodiments not otherwise set forth in detail below. A single one or a combination of two or more of these references may be consulted to obtain an advantageous variation of the preferred embodiments described in the detailed description below and within the scope of the present invention. Further patent, patent application and non-patent references are cited in the written description and are also incorporated by reference into the detailed description of the preferred embodiment with the same effect as just described with respect to the following references:

German Utility Model No. 299 07 349.1;

U.S. Pat. Nos. 5,901,163, 5,856,991, 6,028,879, 5,559, 816, 4,977,563, 4,611,270, 5,404,366, 6,061,382, 5,406,571, 5,852,627, 3,609,856, 5,095,492 3,471,800, 3,546,622, 5,440,574, 6,014,206, 5,373,515, 6,128,323, 6,154,470, 6,157,662, 6,243,405, 6,345,065, 6,285,701, 6,381,256, and 5,479,431;

Japanese patents no. 8-274399, 2-152288, 60-16479, and 62-160783; and

U.S. patent applications No. 09/271,020, 09/771,366, 09/244,554, 09/454,803, 09/657,396, 09/883,097, 09/602,184, 09/453,670, 09/629,256, 09/738,849, 09/718,809, 09/843,604, 09/900,703 and 09/960,875,10/001,954, 10/035,351, 60/281,433, 60/296,947, 60/309,939 and 10/036,848, which are assigned to the same assignee as the present application;

R. Hultzsch: Gitterprismen, Photonik (September 1998), p. 40;

W. Demtroder: Laser Spectroscopy Springer, Berlin Heidelberg (1996) p. 112; and

W. A. Taub: Constant Dispersion Grism Spectrometer for Channeled Spectra J. Opt. Soc. Am. A7 (1990) p. 1779.

DETAILED DESCRIPTION OF THE PREFERRED EMBODIMENTS

Figure 2:
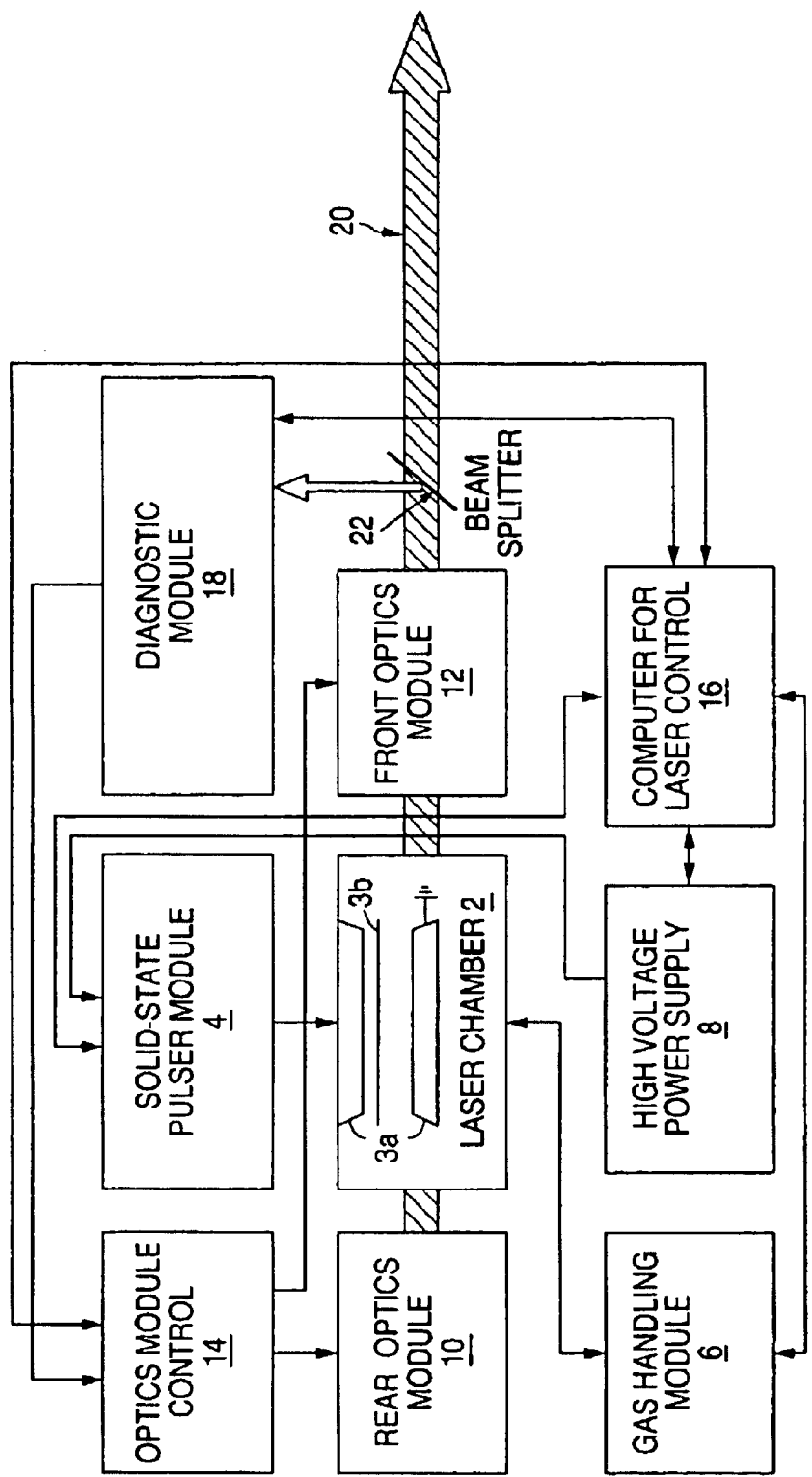
FIG. 2 schematically shows a $F_2$ laser system in accord with a preferred embodiment.

FIG. 2 schematically shows a $F_2$ laser system in accord with the present invention. The system includes a laser chamber 2 filled with a gas mixture and having a pair of main electrodes 3a and one or more preionization electrodes 3b. The electrodes 3a, 3b are connected to a solid-state pulser module 4. A gas-handling module 6 is connected to the laser chamber 2. A high voltage power supply 8 is connected to the pulser module 4. A laser resonator is shown surrounding the laser chamber and including a rear optics module 10 and a front optics module 12. An optics control module 14 communicates with the rear and front optics modules 10, 12. A computer or processor 16 control various aspects of the laser system. A diagnostic module 18 receives a portion of the output beam 20 from a beam splitter 22.

The gas mixture in the laser chamber 2 typically includes about 0.1% $F_2$ and 99.9% buffer gas. The buffer gas preferably comprises neon and may be a mixture of neon and helium (see the '662 patent, mentioned above). A trace amount of a gas additive such as xenon, argon or krypton may be included (see U.S. patent application Ser. No. 09/513,025, which is assigned to the same assignee as the present application and is hereby incorporated by reference).

The gas mixture is preferably monitored and controlled using an expert system (see the 6,212,214 patent, incorporated by reference above, and U.S. Pat. No. 5,440,578, which is hereby incorporated by reference). One or more beam parameters indicative of the fluorine concentration in the gas mixture, which is subject to depletion, may be monitored, and the gas supply replenished accordingly (see U.S. patent applications Ser. Nos. 09/447,882, 09/838,715 and 09/513,025, which are assigned to the same assignee as the present application, and U.S. Pat. No. 6,389,052, which are each hereby incorporated by reference). The diagnostic module 18 may include the appropriate monitoring equipment or a detector may be positioned to receive a beam portion split off from within the laser resonator (see U.S. Pat. No. 4,611,270 and 6,381,256 and U.S. patent application Ser. No. 09/718,809, which is assigned to the same assignee as the present application, each of which is hereby incorporated by reference). The processor 16 preferably receives information from the diagnostic module 18 concerning the halogen concentration and initiates gas replenishment action such as micro-halogen injections, mini and partial gas replacements, and pressure adjustments by communicating with the gas-handling module 6.

Although not shown, the gas-handling module 6 has a series of valves connected to gas containers external to the laser system. The gas-handling module 6 may also include an internal gas supply such as a halogen and/or xenon supply or generator (see the '025 application). A gas compartment or (not shown) may be included in the gas handling module 6 for precise control of the micro halogen injections (see the '882 application and the '052 patent, mentioned above, and U.S. Pat. No. 5,396,514, which is hereby incorporated by reference).

The wavelength and bandwidth of the output beam 20 are also preferably monitored and controlled. A preferred wavelength calibration apparatus and procedure are described at U.S. Pat. No. 6,160,832 and 4,905,243, which are hereby incorporated by reference. The monitoring equipment may be included in the diagnostic module 18 or the system may be configured to outcouple a beam portion elsewhere such as from the rear optics module, since only a small intensity beam portion is typically used for wavelength calibration. The diagnostic module 18 may be integrated with the front optics module 12, and the line-narrowing components of the resonator may be integrated in the front optics module 12, as well, such that only a HR mirror and an optional aperture are included in the rear optics module 10 (see U.S. patent application Ser. No. 09/718,809, which is assigned to the same assignee as the present application and is hereby incorporated by reference).

Preferred main electrodes 3 are described at U.S. patent application Ser. No. 09/453,670 and 09/791,430, which are assigned to the same assignee as the present application and are hereby incorporated by reference. Other electrode configurations are set forth at U.S. Pat. No. 5,729,565 and 4,860,300, which are hereby incorporated by reference. Preferred preionization units are set forth at U.S. patent applications Ser. No. 09/247,887, 09/532,276 and 09/692,265, which are assigned to the same assignee as the present application and are hereby incorporated by reference. The preferred solid state pulser module 4 and the high voltage power supply 8 are set forth at U.S. Pat. Nos. 6,020,723, 6,005,880, 6,198,761 and 6,226,307, and U.S. patent applications Ser. No. 09/858,147, 09/922,222 and 09/640,595, which are assigned to the same assignee as the present application and are hereby incorporated by reference into the present application.

The resonator includes optics for line-selection and also preferably for narrowing the selected line (see U.S. patent applications Ser. No. 09/657,396, 09/657,396, 09/883,097, 09/712,367, 09/718,809, 09/738,849, 09/584,420, 09/883,127, 09/883,128, 09/900,703, 09/244,554, 09/602,184, and 09/629,256, setting forth preferred line selection other than or in addition to that set forth in accord with the preferred embodiment herein below, as well as other advantageous features of excimer or molecular fluorine laser systems, and which are assigned to the same assignee as the present application, and U.S. Pat. No. 6,381,256, 6,345,065, 6,298,080, 6,285,701, 5,095,492, 6,061, 382, 5,761,236, 5,946, 337, 5,684,822, 5,835,520, 5,852,627, 5,856,991, 5,898,725, 5,901,163, 5,917,849, 5,970,082, 6,154,470, 5,404,366, 4,975,919, 5,142,543, 5,596,596, 5,802,094, 4,856,018, and 4,829,536, all of which are hereby incorporated by reference). Some of the line selection and/or line narrowing techniques set forth in these patents and patent applications may be used in combination with or alternative to any of the preferred embodiments set forth below.

Also particularly for the molecular fluorine laser system, an enclosure (not shown) may seal the beam path of the beam 20 such as to keep the beam path free of photoabsorbing species. Smaller enclosures may seal the beam path between the chamber 2 and the optics modules 10 and 12. Advantageously, as mentioned below in accord with a preferred embodiment, the diagnostic components may be integrated into the front optics module 12, separate enclosure components that would otherwise be used between, e.g., a separate diagnostic module 18 and beam splitter module 22, or between the front optics module 12 and beam splitter module 22, would not be used. The preferred enclosure is described in detail in U.S. Pat. No. 6,219,368 and 6,327,290, and U.S. patent applications Ser. No. 09/131,580 and 09/598,552, which are assigned to the same assignee and are hereby incorporated by reference, and alternative configuration are set forth at U.S. Pat. Nos. 5,559,584, 5,221,823, 5,763,855, 5,811,753 and 4,616,908, all of which are hereby incorporated by reference.

Figure 3A:
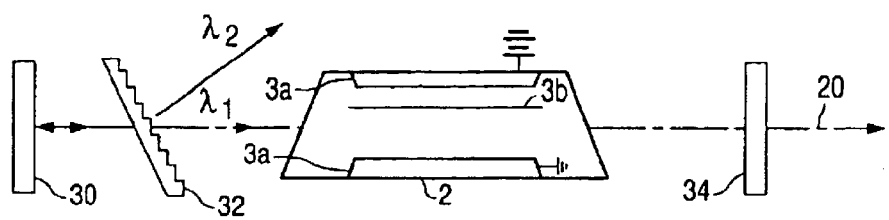
FIG. 3a schematically shows a $F_2$ laser resonator including a transmission diffraction grating for line selection in accord with a preferred embodiment.

FIG. 3a schematically shows a $F_2$ laser resonator including a transmission diffraction grating 32 for line selection in accord with a preferred embodiment. The resonator includes the laser chamber 2 including main discharge and preionization electrodes 3a, 3b, and is filled with a gas mixture preferably including molecular fluorine and a buffer gas such as neon and/or helium, and also preferably includes a heat exchanger and fan for circulating the gas mixture, among other components not shown but which are known to those skilled in the art as being included with an excimer laser tube, such as baffle boxes and a precipitator for keeping the laser windows clean (see U.S. Pat. No. 4,534,034, which is hereby incorporated by reference), aerodynamic components (see, e.g., U.S. patent application Ser. No. 09/453,670, which is assigned to the same assignee as the present application), etc., a highly reflective resonator reflector 30, a transmission diffraction grating 32 and an output coupler 34. The output coupler 34 may be replaced with a second highly reflective mirror and output coupling may be performed by polarization outcoupling from a tilted surface of a polarization beam splitter or a prism or other optical element in the resonator. This alternative outcoupling may be used with preferred embodiments set forth herein, as well.

Figure 1A:
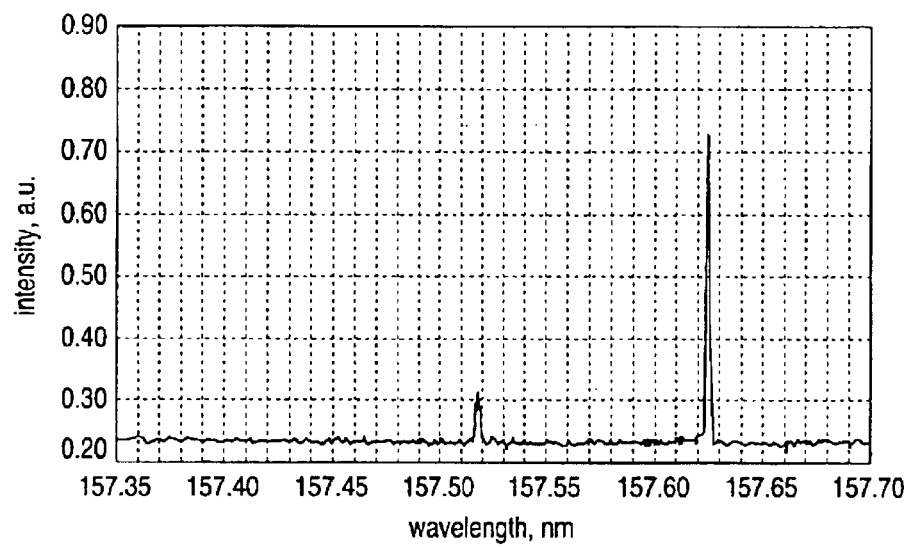
FIG. 1a shows the emission spectrum of a free-running $F_2$ laser with helium as the buffer gas.
Figure 1B:
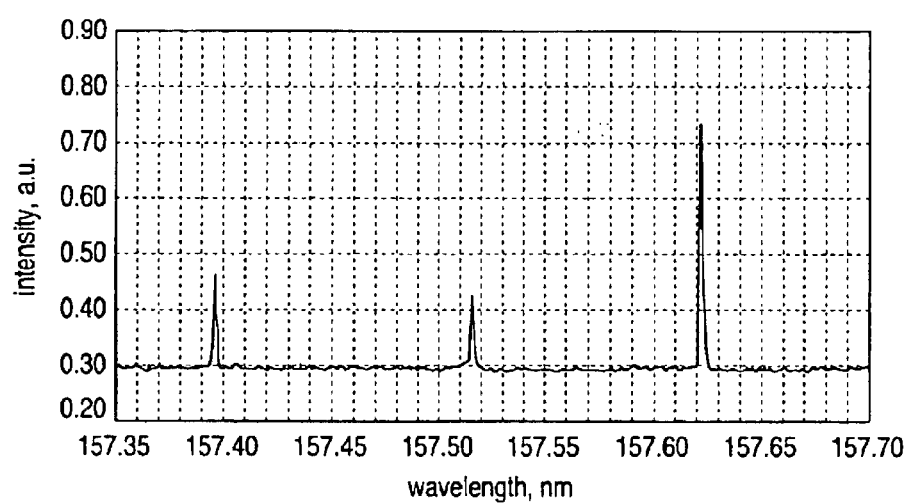
FIG. 1b shows the emission spectrum of a free-running $F_2$ laser with neon as a buffer gas.

The transmission grating 32 disperses the beam as it passes through. A single line (e.g., $80_1$) of the characteristic plural emission lines of the $F_2$ laser (see FIGS. 1a and 1b) remains within the acceptance angle of the resonator and the other line or lines (e.g., including $\lambda_2$) is/are selected out (e.g., due to the dispersion of the grating, or alternatively an interferometric device may select $\lambda_1$ by interference), as illustrated. The grating 32 is aligned at the appropriate angle, as illustrated, preferably so that the selected line $\lambda_1$ is centrally positioned within the acceptance angle of the resonator. Means for rotating the grating 32 may be included for performing the alignment online or otherwise. Although not shown, optics for narrowing the selected line $\lambda_1$ may be preferably also included in the laser resonator such as an etalon or other interferometric device, one or more apertures and/or a prism or prisms (see the '470 patent and the '803 application, incorporated by reference above).

Figure 3B:
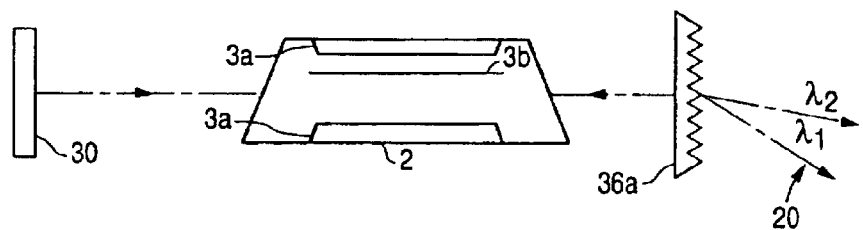
FIG. 3b schematically shows a $F_2$ laser resonator including a transmission diffraction grating as an output coupler also in accord with a preferred embodiment.

FIG. 3b schematically shows a $F_2$ laser resonator including a transmission diffraction grating 36a as an output coupler in accord with a preferred embodiment. The grating 36a disperses the beam 20 such that the beam 20 including only the selected line $\lambda_1$ is used for industrial processing applications for which the laser is intended. Advantageously, visible (red) atomic fluorine emission is also filtered from the beam at the grating outcoupler 36a. The grating 36a also reflects a portion of the beam back into the gain medium. As such, the grating 36a performs the dual function of dispersing the beam 20 for line selection and outcoupling the laser beam 20 (and also filtering the red light).

The grating 36a may be configured as in FIG. 3b to have a partially reflective surface for reflecting light back into the gain medium, while only the light transmitted at the partially reflective surface is incident at the ruled or grating surface of the grating 36a. As such, the beam is dispersed and the primary line $\lambda_1$ around 157.62 nm is selected, while the secondary line $\lambda_2$ around 157.52 nm is dispersed away from the beam acceptance angle, after the beam is output coupled. In this way, the grating 36a serves as a spectral filter outside the laser resonator. Alternatively (and preferably when the grating 36a is the only line-selection element in the resonator), the surface facing the chamber 2 may have an AR coating on it, and the ruled surface of the grating 36a is partially reflective, such that only the primary line $\lambda_1$ is reflected back into the chamber to be amplified by the gas mixture or gain medium.

Figure 3C:
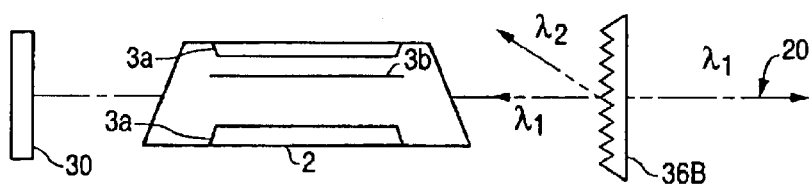
FIG. 3c schematically shows an alternative embodiment of a $F_2$ laser resonator including a transmission diffraction grating as an output coupler in accord with a preferred embodiment.

The grating 36b is a variation of the latter of the embodiments just described relating to the grating 36a. The grating 36b shown in FIG. 3c has a ruled or grating surface facing the discharge chamber 2. In this way, the unselected line $\lambda_2$ is dispersed away from the acceptance angle of the resonator and only the selected primary line $\lambda_1$ is reflected back into the chamber 2 for amplification by the gain medium. Preferably, the back surface away from the chamber 2 of the transmission grating 36b has an antireflective (AR) coating formed on it to reduce or prevent reflection from the back surface.

In the second embodiment, one optical element serves at least two functions, advantageously reducing the number of potentially lossy surfaces the beam encounters and reducing the overall size of the resonator. In addition, fewer optical components means greater simplicity for alignment and fewer optical components that may need to be replaced due to aging. Also, fewer surfaces means less wavefront distortions due to imperfections at those surfaces resulting in undesirable bandwidth broadening.

In either of the embodiments shown in FIGS. 3a and 3b, the intensity of the unselected line $\lambda_2$ may be monitored by an energy detector positioned to receive the unselected line $\lambda_2$ after having been dispersed away from the acceptance angle of the beam that includes the primary line $\lambda_1$. The detected intensity of the unselected line $\lambda_2$ can provide information about the intensity of the selected line $\lambda_1$ or about the gas mixture or laser optics. Advantageously, with this feature, the beam including the selected line $\lambda_1$ does not encounter a beam splitter for reflecting a portion to an energy detector, because the unselected line is used for this purpose. A portion of the selected line $\lambda_1$ may be otherwise split off for another purpose such as for monitoring a spectral distribution of the beam 20, or the selected line $\lambda_1$ of the main beam 20 may be undisturbed on its way to application processing, while diagnostics are entirely performed using the unselected line $\lambda_2$. In either of the above embodiments, the material of the grating is at least substantially transparent to 157 nm radiation, and as such, calcium fluoride ($CaF_2$), barium fluoride ($BaF_2$), magnesium fluoride ($MgF_2$), strontium fluoride ($SrF_2$) and lithium fluoride (LiF) may be used. In other embodiments described herein, transmissive optical components are preferably formed from one or more of these materials, and in some embodiments, it may be desired either particularly to use or particularly not to use magnesium fluoride ($MgF_2$) due to its birefringent nature (see, e.g., U.S. Pat. No. 6,345,065 and U.S. patent application Ser. No. 10/001,954, which is assigned to the same assignee as the present application, which are hereby incorporated by reference). The '065 patent and '954 application show that in some cases, the birefringence of magnesium fluoride may be advantageously used (see also U.S. patent application Ser. No. 09/883,127, which is assigned to the same assignee and is hereby incorporated by reference).

Figure 4A:
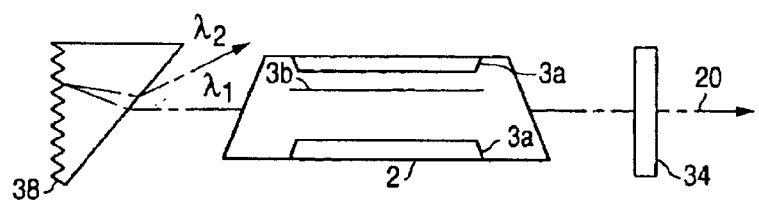
FIG. 4a schematically shows a $F_2$ laser resonator including a grism for line selection in accord with a preferred embodiment.

FIG. 4a schematically shows a $F_2$ laser resonator including a grism 38 for line selection in accord with a preferred embodiment. The resonator includes a grism 38 and an outcoupler 34 on either side surrounding the laser chamber 2. The grism 38 is an integrated combination of a prism and a grating and advantageously provides improved line selection as a result (for background and description of additional features of grism optics, see, e.g., U.S. patent applications Ser. No. 09/602,184 and 091738,849, which are assigned to the same assignee as the present application, and references cited therein including R. Hultzsch, Gitterprismen, Photonik (September 1998), p. 40, each of which is hereby incorporated by reference). The grating and prism aspects of the grism 38 may each provide dispersion, or the prism may be used solely to expand the beam to reduce divergence and utilize a larger surface area of the grating surface for improved grating performance, such that the dispersion of the grism 38 is enhanced over that of either a prism or grating alone.

The grating aspect of the grism 38 may serve to select the desired line $\lambda_1$ while the prism aspect of the grism 38 may serve to narrow the selected line, when used within a molecular fluorine laser resonator. The prism aspect may serve to expand the beam to enhance the dispersion of the grating aspect, as well, particularly for greatly narrowing a broadband characteristically emitting system such as an ArF or KrF excimer laser. The back surface of the grism 38 shown in FIG. 4a is highly reflective so that the grism 38 serves the additional function of a resonator reflector, and the advantages of reducing the number of optical components set forth above are also achieved. The grism 40 may also be oriented so that the grating surface is first encountered and the smooth back surface of the prism component provides the highly reflective surface to perform the resonator reflector function of the grism 38.

Alternatively, a HR mirror may be included after the grism, wherein no reflective coating would be applied to the grism surfaces, and in this embodiment, AR coating would be preferably applied to the grism surfaces. In either case, with or without the HR mirror, the entrance surface of the grism closest to the laser tube 2 preferably includes an AR coating thereon.

FIG. 4b schematically shows a $F_2$ laser resonator including a grism 40 as an output coupler in accord with another preferred embodiment. The grism 40 shown at FIG. 4b serves the multiple functions of line selection, line narrowing and output coupling, with advantageous reduction in the number of optical components typically used for providing all of these functions. The grism 40 preferably has a partially reflecting surface at the surface of the prism component away from the grating to perform the function of an output coupling resonator reflector. The grism 40 may also be oriented so that the grating surface provides the partially reflecting surface and the beam ultimately exits at the smooth prism side of the grism 40. Also, the grism 40 may be oriented as in FIG. 4b, and differ from the preferred arrangement described above in that an AR coating may be applied to the smooth prism surface closest to the discharge chamber 2, and the grating surface may serve as the partially reflecting resonator reflector surface. In any of these alternative configurations, advantageously, red atomic fluorine emission is also filtered at the grism outcoupler 40, and the unselected line (e.g., the secondary line around 157.52 nm) may be used for diagnostic purposes as described above with respect to FIG. 3b. In general, it is preferred that a line-narrowed beam be reflected back through the discharge chamber 2 by the grism outcoupler 40 or other line-narrowing outcoupler that may be used as an intra-cavity line-narrowing optic such as an interferometric outcoupler, rather than the broadband beam incident upon the optic 40 being reflected back through the discharge chamber 2 such that the line-narrowing grism 40 or other optic actually serves as an extra-cavity spectral filter rather than as a preferred intra-cavity line-narrowing optic (in this regard, see also U.S. patent application Ser. No. 09/718,809, which is assigned to the same assignee as the present application and is hereby incorporated by reference).

The grating portion of either of the grisms 38,40 set forth above may be on the surface of the prism material or may be etched into the prism material such as by ion beam etching (see U.S. patent application Ser. No. 09/712,367, which is assigned to the same assignee and is hereby incorporated by reference). These two grism configurations are discussed by R. Hultzsch, "Gitterprismen", Photonik, p. 40 (Sept. 98), which is hereby incorporated by reference. Additional grism discussions are set forth at the Ser. No. 09/602,184 application, incorporated by reference above, and U.S. Pat. No. 5,625,499 and 5,652,681, each of which is hereby incorporated by reference.

The grism 40 as an output coupler is also preferably used with a KrF excimer laser and with an ArF excimer laser. In order to achieve an alternative resonator configuration without the grism 40 with comparable dispersive power to the resonator having the grism 40 as an output coupler according to a preferred embodiment, a very large angle prism, two or more prisms and/or a high dispersive grating may be used. However, all of these alternatives introduce high losses for the laser radiation bouncing back and forth within the resonator. This tends to worsen the ratio between broadband background radiation and the selected line or narrow band emission. In addition, to perform line selection or line narrowing with sufficient angular dispersion, the resonator would be bent or elongated. This can tend to result in additional power losses. Besides the dispersive elements, resonator mirrors and beam steering mirrors would likely be used. This makes resonator alignment using a pilot or reference laser more difficult.

A brief discussion of dispersion by an ordinary prism is discussed here to illustrate the advantages of using the grism 40 as an output coupler or otherwise in a preferred excimer or molecular fluorine laser which are described further below. FIG. 5 shows a dispersive prism 101 illustrating its angular dispersive properties. In FIG. 5, the following reference characters are used:

$\epsilon$: prism apex angle $\alpha_1$: angle of incidence $\alpha_1$: output reflection angle a: beam dimension n: refractive index of the prism L: length of the basis $\Theta$: angle of beam deflection.

An incident chief ray 102 is shown as a solid line while outer or marginal rays of an incident laser beam are shown by dashed lines. The incident chief ray impinges upon an incidence surface 103 of the prism 101 at an incident angle $\alpha_1$, whereupon the ray 102 is refracted based on the Snell's relation. Since, the index of refraction n of the prism material is wavelength dependent, the angle of refraction differs depending on the wavelength producing dispersion of the wavelengths of the incident ray 102. The refracted ray 104 is then incident at an exit surface 105 of the prism 101 and is again refracted at an angle depending on its wavelength producing an exit ray 105 deviated from its incident direction, or the direction of the incident ray 102 by an angle Θ. For minimum deviation:

$\alpha_1 = \alpha_2 = \alpha$; and $\Theta = 2\alpha - \epsilon$

The angular dispersion of the incident beam illustrated by the chief ray 102 is given by:

$$d\Theta/d\lambda = (d\Theta/dn)(dn/d\lambda) \quad (a),$$

and $$d\Theta/d\lambda = [2\sin(\epsilon/2)/(1-n^2\sin^2(\epsilon/2))^{1/2}](dn/d\lambda) \quad (b)$$

FIGS. 6a and 6b illustrate two alternatively preferred prism-grating or grism configurations. FIG. 6a shows a grism wherein the grating is attached to the back face of a prism. FIG. 6b shows a grism wherein the grating is engraved or etched into the solid material.

The material of the grisms of either FIG. 6a or 6b may be glass, fused silica, $CaF_2$, $BaF_2$, $MgF_2$ or another similarly transmissive optical material, adapted to the special wavelength of interest. For excimer lasers and especially the molecular fluorine laser ($F_2$-laser) emitting near 157 nm, $CaF_2$, $BaF_2$, $MgF_2$, and LiF, are possible materials, where $CaF_2$ is the preferred material for $\lambda < 200$ nm such as for ArF lasers emitting around 193 nm and for the $F_2$ laser emitting around 157 nm.

Figure 7A:
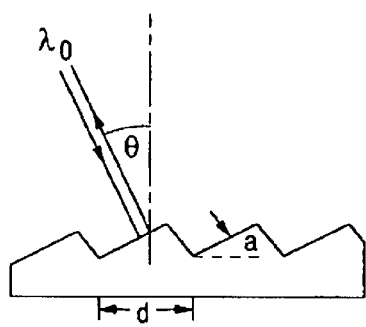
FIG. 7a shows a reflective grating.
Figure 7B:
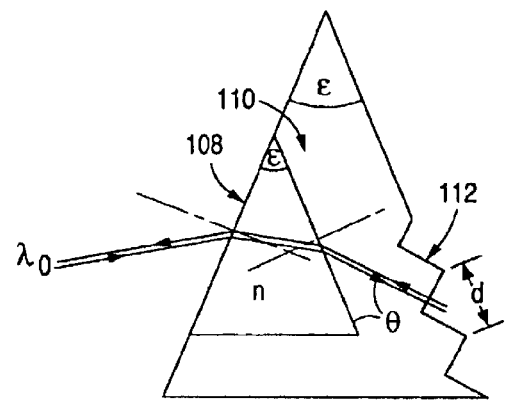
FIG. 7b shows a reflective grism.

FIGS. 7a–7b shows a comparison of actions of a reflective grating (FIG. 7a) and a grism (FIG. 7b) as wavelength selective retroreflectors. For the reflective Littrow grating of FIG. 7a:

α=blaze angle; and

Θ=angle of incidence

A maximum reflectivity is achieved for wavelengths satisfying the reflection relation;

$\alpha = \Theta$;

where, $$\lambda_0 = (2d/m)\sin\Theta \quad (4)$$

d=grating constant
m=diffraction order.

For a reflective grism, as in FIG. 7b, where an incident ray is refracted at an incidence surface 108, propagates through the prism material 110 of the grism, and reflects from a back grating surface 112 of the grism, a maximum reflectivity is also achieved at a certain wavelength $\zeta_0$. Moreover, a bandwidth of the retroreflected beam is reduced by the dispersive powers of both the prism 110 and the grating 112 components of the grism, such that a spectral range that remains within the acceptance angle of the resonator upon reflection is greatly reduced. That is, the dispersion from the grism is a combined action between a pre-dispersion produced by a prism 110 (including beam expansion of the spectral range not dispersed from the acceptance angle of the resonator) and the grating surface 112.

Figure 8:
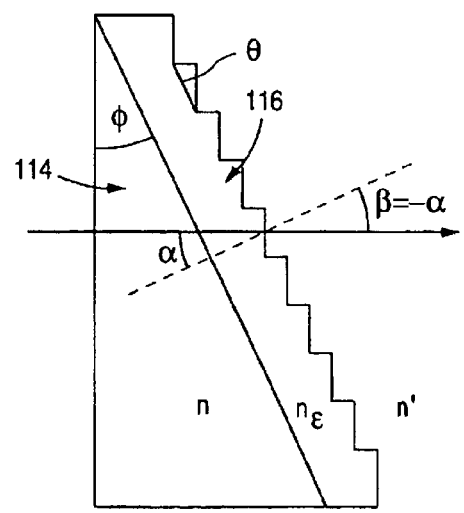
FIG. 8 shows a grism designed for straight through selected line propagation.

FIG. 8 schematically illustrates a grating-prism (grism) including a prism 114 and an attached or etched in grating 116 designed to achieve a straight-through chief ray path for a selected wavelength. As shown in FIG. 8:

φ=prism apex angle;

Θ=blaze angle of the grating 116 (wherein, note that the grating 116 may be attached (as shown) or cut or etched into the original prism 114);

α, β=the angles of incidence and refraction with respect to a normal to the grating 116, respectively;

η, $\eta_E$, n'=refractive indices of the prism material 114, grating 116 at ambient atmosphere and air, respectively, wherein the material of the prism 114 may the same as the material of the grating 116, e.g., $CaF_2$ may be used for both, such that $n = \eta_E$.

To achieve a straight through beam path:

$\alpha = -\beta = \phi$; and $\phi = \Theta(2)$

As for the wavelength:

$$\lambda_0 = (d/m)(n-1)\sin\phi \quad (2a)$$

and the angular dispersion may be written as:

$$d\Theta/d\lambda = m/d(n-1)\cos\Theta \quad (3)$$

$$d\Theta/d\lambda = (1/\lambda)\tan\Theta \quad (3a)$$

FIGS. 9a–9c and 9f schematically illustrates dispersive resonators for line narrowing or line selection that do not include the grism of this preferred embodiment. FIGS. 9d–9f and 9g illustrate the relative respectively narrowed bandwidths of a beam 205 output from the resonators illustrated at FIGS. 9a–9c and 9h.

FIG. 9a shows a semi-narrow band resonator including a discharge chamber 201, a dispersive prism 202, a highly reflective mirror 203 and an outcoupler 204, and including an intracavity aperture 208, for producing a output beam 205. FIG. 9d illustrates a bandwidth $BW_a$ and a background radiation level $U_a$ of the output beam 205 of FIG. 9a. The background radiation level $U_a$ is not substantially suppressed by the prism 202 located on the opposite end of the resonator from the outcoupler 204. The length of the resonator is shown as $L_a$.

FIG. 9b shows a narrow band or semi-narrow band resonator including a discharge chamber 201, a pair of dispersive prisms 202a and 202b, an HR mirror 203 and an output coupler 204, and including an intracavity aperture 208, for producing a narrow or semi-narrow output beam. FIG. 9e illustrates a bandwidth $BW_b$ and a background radiation level $U_b$ of the output beam 205 of FIG. 9b. Again, the background radiation level $U_b$ is not substantially suppressed by the prisms 202a, 202b located on the opposite end of the resonator from the outcoupler 204. The length of the resonator is shown as $L_b$.

FIG. 9c shows a narrow band resonator including a discharge chamber 201, a dispersive prism or a beam expanding prism 212 (a prism beam expander may include more than one prism), and an outcoupler 204, and including an intracavity aperture 208, for producing a narrow-band output beam 205. FIG. 9f illustrates a bandwidth $BW_c$ and a background radiation level $U_c$ of the output beam 205 of FIG. 9c. Again, the background radiation level $U_c$ is not substantially suppressed by the prism or prisms 212a, nor the grating 206 each located on the opposite end of the resonator from the outcoupler 204. The length of the resonator is shown as $L_c$.

FIG. 9g shows a semi-narrow band resonator including a discharge chamber 201, a dispersive prism 202, an HR mirror 203 and an outcoupler 204, and including an intracavity aperture, for producing a semi-narrow-band output beam 205. FIG. 9h illustrates a bandwidth $BW_d$ and a background radiation level $U_d$ of the output beam 205 of FIG. 9g. In this case, the background radiation level $U_d$ is substantially reduced, and is nearly zero, due to its being dispersed by the prism 202 before passing through the output coupler 204. The prism 202 is advantageously disposed on the output coupling end of the resonator to achieve this suppression of the background radiation. This feature is described in more detail below with reference to FIG. 11. The length of the resonator is shown as $L_d$.

Also shown in FIG. 9g are a pair of steering mirrors 207a and 207b. The prism 202 bends the beam, as shown. The steering mirrors are arranged to bring the beam 205 back to parallel or possibly coaxial with the intracavity beam direction to the left of the prism 202 in FIG. 9g.

FIG. 10a shows a narrow band resonator including a discharge chamber 201, a grism outcoupler 210, an HR mirror 203 and a pair of intracavity apertures 208 and 218 for producing a narrow-band output beam 205. FIG. 10b illustrates a bandwidth $BW_d$ and a background radiation level $U_d$ of the output beam 205 of FIG. 10a. In this case, the background radiation level $U_G$ is substantially reduced, and is nearly zero, due to its being dispersed by the grism output coupler 210 as it is outcoupled from the laser resonator. It is preferred that the grating surface 220 of the grism 210 be partially reflecting such that the beam is dispersed before travelling back through the discharge chamber 201 for further amplification. The grism 210 is advantageously disposed on the output coupling end of the resonator to achieve this suppression of the background radiation.

In addition, the presence of the grating surface 220 of the grism 210, which is not present in the embodiment of FIG. 9g, advantageously produces narrow-band line-selection, and not merely semi-narrow band line selection. This is particularly advantageous when the laser is a broadband emitter such as an ArF or KrF laser. Improved line-selection of a single line of multiple lines around 157 nm and suppression of the visible emission of the molecular fluorine laser are also achieved. The length of the resonator is shown as $L_G$.

The grism 210 may be rotated for tuning the line-narrowed laser. In this case, the straight ahead beam propagation feature may be somewhat altered, but the beam propagation would not be bent substantially, such that the beam propagation would remain substantially or significantly straight, yielding an advantage over purely bent resonator configurations.

Some advantages are clearly realized with the resonator configuration of FIG. 10a. For the resonator lengths $L_a$–$L_c$ and $L_G$ of the resonators of FIGS. 9a–9c and FIG. 10a, below, the following relation is observed (using identical or substantially similar components, e.g., discharge chamber 201 and so on):

$$L_G << L_a \approx l_b \leq L_c \quad (4)$$

The shorter resonator length can be used to achieve a more compact laser. Losses are also reduced with the shorter resonator, which is particularly advantageous for the molecular fluorine laser.

There is also the advantage of reducing the spectral bandwidth:

$$BW_a \approx BW_d > BW_b \approx BW_G > BW_c \quad (5)$$

An additional prism or other optic may be disposed before the grism 210 to bring the degree of line-narrowing achieved with the configuration of FIG. 10a closer to that achieved with the Littrow grating configuration of FIG. 9c.

The effective suppression of the broadband background radiation:

$$U_a \approx U_b \approx U_c >> U_d \approx U_G \quad (6)$$

is also favorable for the grism output coupler resonator design.

Considering the properties as compared in the relations (4) to (6), the resonator design illustrated at FIG. 10a with the grism output coupler 210 is a very suitable and convenient solution optimized for at least semi-narrow band spectral emission. The design of FIG. 10a may be used with additional optics to achieve a narrow band output beam (e.g., less than 0.6 pm) by inserting one or more additional optics such as a prism before the output coupling grism 210, and while still achieving a shorter resonator.

Considering the dispersive power of the resonator of FIG. 10a, the increase of the dispersive power of a grism over that provided by only the dispersive prism 202, e.g., as shown in FIG. 9g, to a value similar to that provided by the high dispersive grating in Littrow mount shown in FIG. 9c can be demonstrated by using the relevant equations and calculating the angular dispersion.

The greater the angular dispersion, the stronger is the dispersive power. Therefore, the effect of line narrowing or efficiency of line selection (or suppression of a second line nearby the selected one for the molecular fluorine laser) is advantageously improved.

For otherwise identical values such as prism apex angle, refractive index and angle of incidence, the angular dispersion, e.g., for the primary line $\lambda=157.6299$ nm of the multiple lines around 157 nm for the molecular fluorine laser (wherein a single element is used in each case) is estimated as follows, wherein $CaF_2$ is assumed to be the refractive material:

Beginning with using equation (1), above, from the discussion relating to FIG. 5, $d\Theta/d\lambda$ for the prism 202 is calculated as $$d\Theta/d\lambda = 2.48 \times 10^{-3} \text{ mrad/pm.}$$

For $CaF_2$, n (at 157.63 nm)=1.5587, and $dn/d\lambda$ (157 nm)=−0.002605/nm and the prism apex angle $\epsilon$−45°, and the angle of incidence is equivalent to the blaze angle as used above.

For a Littrow grating, using equation (4), $d\Theta/d\lambda = 6.34 \times 10^{-3}$ mrad/pm, and $\lambda=(2d/m)\sin\Theta$, as usual.

For a grism, using equation (3), $d\Theta/d\lambda = 6.34 \times 10^{-3}$ mrad/pm;

$d\lambda/d\Theta = (2d/m)\cos\Theta = \lambda/\sin\Theta$; and $\cos\Theta = \lambda/\tan\Theta$ wherein, $\lambda_0 = 157.6299$ nm is the selected wavelength, $\Theta = 45°$ is the angle of incidence. In addition, with $CaF_2$ being the same material as described above, and $\phi = \Theta$ such that the prism angle $\phi$ of FIG. 8 is equal to the blaxe angle $\Theta$, a straight through beam path is realized through the grism output coupler 210 as shown in FIG. 10a.

In brief, using a grism 40 as an output coupler (see FIGS. 10a–10b) provides at least the following advantages over alternative resonator designs, such as those shown at FIGS. 9a–9c and 9g:

1. There is an increase of the dispersive power when only one element, i.e., a grism 210, is used, or an increase of the dispersive power of one element, i.e., the grism 210, of two or more of a line-narrowed resonator.

2. There is a reduction of resonator losses by using only one element, or by combining two elements in one, wherein fewer lossy optical interfaces are within the resonator. The reduced resonator size may also contribute to additional reduction in losses by absorption.

3. A very short resonator is provided, due to the presence of the grism 210, which combines both line selection and output coupling functions in one element, wherein preferably no coating is used with the grism 210 such as may be used with an outcoupling mirror.

4. A straight ahead beam propagation is achieved for the one selected wavelength which fulfills the straight-through path equation for the given grism 210 (see equation 2).

5. Because the grism 210 is located at the output side of the laser resonator, the grism 210 suppresses any parasitic background or second line emission, which is generated in the last resonator round trip, very efficiently.

6. Resonator adjustment by a pilot or reference laser is facilitated which does not transmit an oblique prism.

The resonator with the grism output coupler 210 has a same or substantially a same dispersive power as a blazed grating in Littrow configuration and about a factor of 2.5 higher dispersive power as a prism with the same prism angle. To achieve a comparable dispersion with usual prisms, at least a second prism is used to increase the dispersion effect by a factor of 2. A similarly compact resonator, however, as achieved with the grism output coupler 210 of FIG. 10a is not present with such a multiple prism configuration.

FIG. 11 schematically shows a $F_2$ laser resonator having line selection fully performed at the front optics module 12 of the resonator in accord with the third preferred embodiment. The wavelength selector 40 is schematically illustrated as fully integrated with the front optics module 12 in FIG. 11. The wavelength selector 40 may include any of the line selection techniques discussed herein (see FIGS. 3b and 4b) or in the patents and patent applications referenced above. Optics of the wavelength selector may include one or etalons or other interferometric devices (see the "883 and '803 applications), and/or prisms, a grating, a birefringent plate (see the '065 patent), a grism, etc. The resonator is advantageously simplified and may be shortened. For example, the highly reflective mirror 30 may be brought closer to the laser chamber 2 than if additional optics were included with the rear optics module including the mirror 30. The highly reflective mirror may even be a window of the laser chamber 2. Also optics control and beam monitoring can each take place around the front optics module permitting some versatility in overall laser system and housing design.

The beam is advantageously output coupled on a same side of the discharge chamber 2 as the line selection is performed in this embodiment. Preferably, the line-selection occurs prior to output coupling, such that radiation emanating directly from the discharge chamber is line-selected and/or line-narrowed prior to being output coupled, thus improving spectral purity (for alternative embodiments according to this feature, see U.S. patent application Ser. No. 09/718,809, which is assigned to the same assignee and is hereby incorporated by reference). The output coupler itself may perform line selection, e.g., using an outcoupling prism, grating, grism, birefringent prism or crystal (see below and U.S. patent applications Ser. No. 09/883,127 and 10/001,954, which are assigned to the same assignee and are hereby incorporated by reference), or an output coupling interferometer (see U.S. patent applications Ser. No. 09/715,803 and 10/081,883, incorporated by reference above). Diagnostic tools may be included in a same front optics module with the output coupler/line-selection optic or optics, such as any of those shown at FIGS. 6a through 8b, or other tools for monitoring the pulse energy, beam power, wavelength, bandwidth, spatial or temporal pulse shape, amplified spontaneous emission (ASE), discharge width, breakdown voltage, and/or other parameters indicative of the fluorine concentration in the tube, etc.

Figure 12:
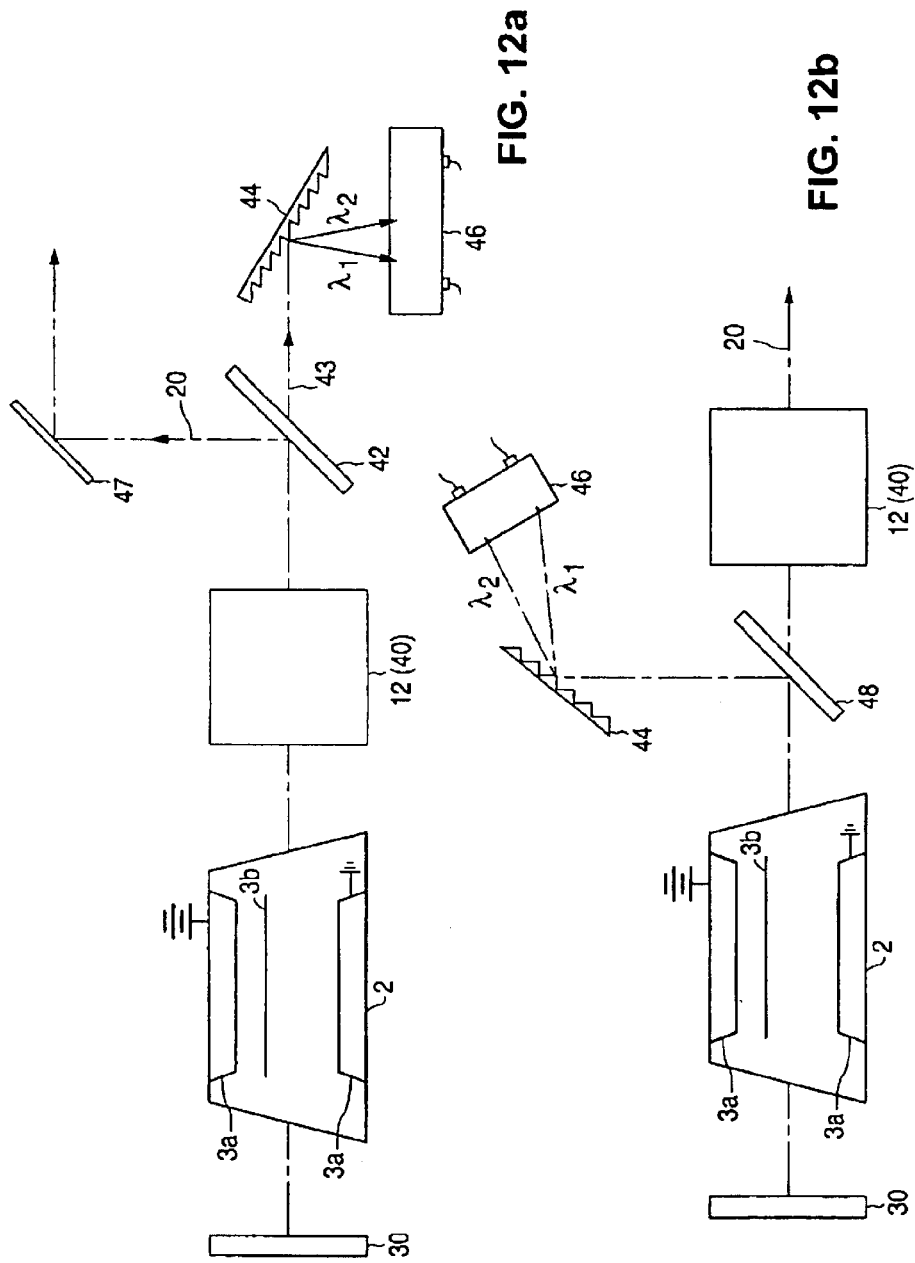
FIG. 12a schematically shows a $F_2$ laser system with a monitor grating and array detector in accord with a preferred embodiment.
FIG. 12b schematically shows a $F_2$ laser system with a monitor grating and array detector also in accord with a preferred embodiment.

FIG. 12a schematically shows a $F_2$ laser system (or other laser system such as an ArF or KrF system) with a monitor grating 44 and array detector 46 in accord with a preferred embodiment. The beam 20 is outcoupled from the front optics module 12 and impinges upon a highly reflective or substantially reflective mirror 42. The highly reflective mirror typically has a reflectivity around 96%. The beam 20 is reflected from the HR mirror 42 and continues on to the industrial application for which it was intended, preferably first being redirected by another HR mirror 47. Although not shown, a reference beam may be provided behind the mirror 47 for propagating collinear with the beam 20 for controlling an alignment of the beam 20 (see the '809 application).

The beam portion 43 that passes through the HR mirror 42 next encounters a grating 44 (if desired to use only purely reflective optics, such as if the arrangement were to be modified for EUV applications around 11 nm to 15 nm, then the mirror 42 could be replaced with an all-reflective beam-splitting optic as may be understood by those skilled in the art). In FIG. 12a, the grating 44 is a reflection grating, but a configuration using a transmission grating also may be used. Also, another dispersive element such as a prism or grism may be used rather than the preferred reflection grating 44, and the grating is preferred due to its high dispersive power over the prism and its simplicity relative to the grism. The beam portion 43 is dispersed by the grating 44 and the dispersed components of the beam portion 43 are detected at an array detector 46, such as a CCD array 46.

The system of FIG. 12a may be used generally for monitoring of excimer or molecular fluorine laser beams, or even modified for EUV beam monitoring. However, particularly for $F_2$ laser applications, the intensities of each of the selected line $\lambda_1$ and the unselected line $\lambda_2$ may be advantageously separately monitored at the CCD array. If the line selection (shown here performed at the front optics module 12, although any of the above described techniques or those set forth in any of the patents or patent applications referred to above may be used in some embodiments) is performed optimally, then the intensity of the unselected line $\lambda_2$ will be very small, and ideally zero. However, if the intensity of the unselected line is above the intensity that is expected or above a tolerance or predetermined value, then the wavelength selector may not be optimally aligned, or a component may not be performing optimally. Thus, the performance of the wavelength selector can be advantageously monitored in accord with the fourth preferred embodiment. The divergence of the wavelength selector may also be monitored by monitoring the beam profile with an array detector (wherein a grating is not before the detector).

Depending on the intensity information received, the optics of the wavelength selector may be adjusted in a feedback arrangement to minimize the intensity of the unselected line $\lambda_2$, or to maximize the ratio of the intensities of the selected and unselected lines $\lambda_1/\lambda_2$. The intensity of the selected line or both lines may be monitored and the driving voltage may be controlled for stabilizing the energy of the beam 20, or the gas mixture may be adjusted to stabilize various beam parameters, based on the intensities detected.

FIG. 12b schematically shows a $F_2$ laser system with a monitor grating 44 and array detector 46 also in accord with an alternative to the fourth embodiment. In contrast with the arrangement set forth at FIG. 12a, a beam splitter 48 is provided between the laser chamber 2 and the front optics module 12 for reflecting a portion of the beam toward the monitor grating 44. The beam 20 is advantageously outcoupled directly to its destination. The beam splitter 48 can be a polarizing element (as a Brewster surface or thin film polarizer) to improve the degree of polarization of the output beam.

Figure 13:
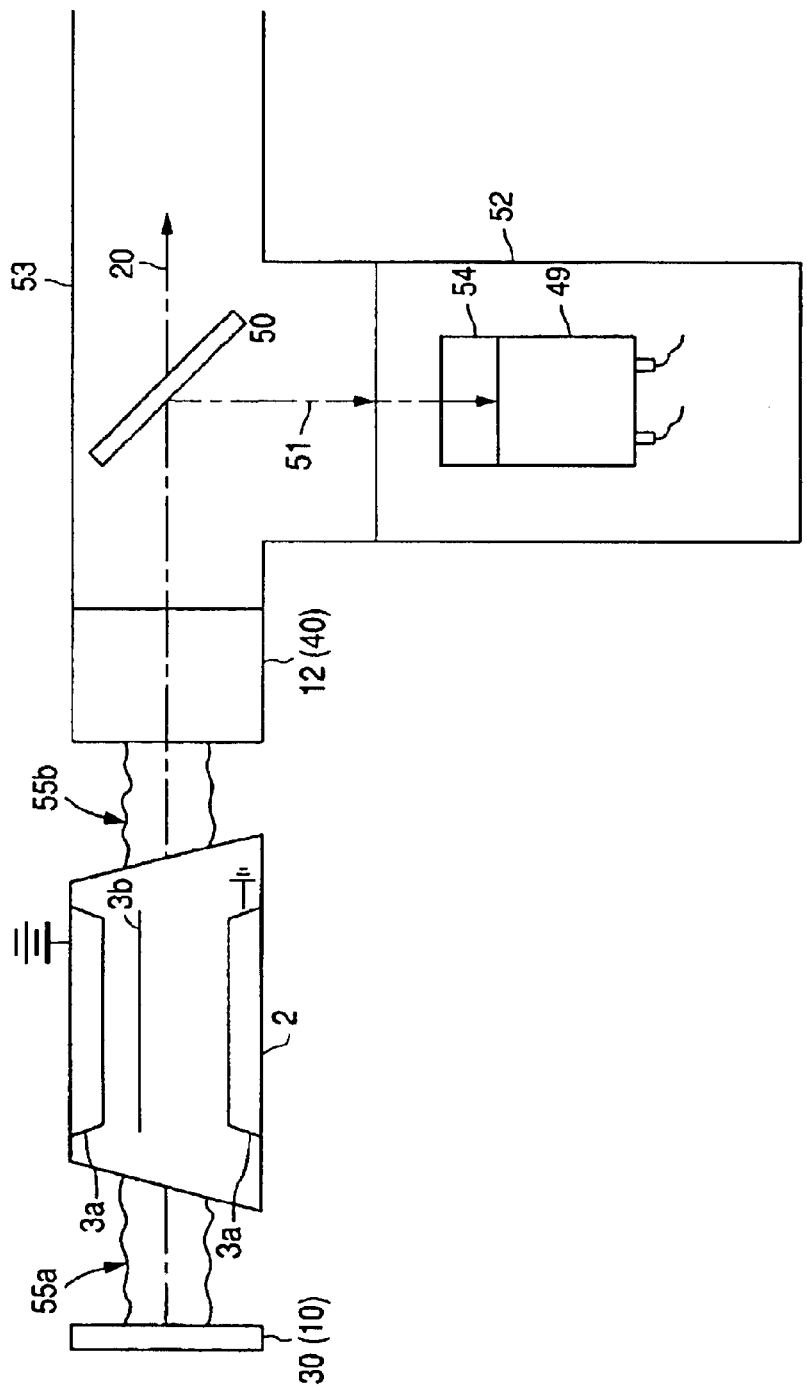
FIG. 13 shows an energy detector for use with a $F_2$ laser system in accord with a preferred embodiment.

FIG. 13 shows an energy detector 49 for use with a $F_2$ laser system in accord with a fifth embodiment. A beam splitter 50 redirects a beam portion 51 towards the energy detector 49, allowing the main beam 20 to pass through. The detector 49 may be a diode or photomultiplier detector, and may be a diamond detector such as that set forth in U.S. patent application Ser. No. 09/512,417, or a PtSi photodiode detector such as that set forth at U.S. patent application Ser. No. 09/771,013, each application being assigned to the same assignee as the present application and being hereby incorporated by reference. The detector 49 is preferably particularly designed to be sensitive at 157 nm for a $F_2$ laser (and alternatively at 193 nm for an ArF laser, or EUV wavelengths, etc.). For $F_2$ laser applications, optics for filtering the red emission of the laser may be included such as a dispersive element, holographic beam splitter, dichroic mirror(s), or red light filter before the detector, or otherwise as set forth at U.S. patent applications Ser. No. 09/598,552 and 09/712,877, which are assigned to the same assignee and are hereby incorporated by reference.

The detector 49 is advantageously enclosed in a sealed enclosure 52. The sealed enclosure 52 is preferably sealably connected with a beam path enclosure 53 that encloses the path of the outcoupled main beam 20 and that is itself sealably connected to the laser resonator such that the beam 20 is never exposed to and absorbed by oxygen and water present in ambient air (see also U.S. Pat. No. 6,129,368 and 6,327,290, and U.S. patent applications Ser. No. 09/598,552, 09/131,580, and 09/718,809, which are assigned to the same assignee as the present application, each patent and patent application being hereby incorporated by reference). The entire resonator itself is also kept free of the photoabsorbing species such as by using the pair of smaller enclosures 55a and 55b shown in FIG. 13 between the laser tube 2 and the rear and front optics modules 10 or 30 and 12 or 40, respectively.

Photoabsorbing species such as oxygen, hydrocarbons and water are removed from the enclosure 52, such as by pumping them out with a high vacuum pump, such as a turbo pump, or by pumping for a long time with a rotory or mechanical (roughing) pump. The pumping can be continued until high vacuum is reached. However, preferably only a roughing pump (not shown) is used and a series of pumping steps each followed by purging with inert gas are performed more quickly and with better results, such as is described in the '368 patent relating to the beam path enclosure 53.

After the contaminants are removed, a low flow of inert gas such as argon or helium continuously purges the sealed enclosure while the laser is operating. The enclosure 52 and the enclosure 53 may be open to one another such that the same purging gas fills both enclosures 52 and 53, or the enclosures 52 and 53 may be separately maintained. The flow rate of the purging inert gas is selected such that only a slight overpressure is maintained in the enclosure 52. For example, 1–10 mbar overpressure is preferred, and up to 200 mbar overpressure could be used. The flow rate may be up to 200 liters/hour, and is preferably between ten and fifty liters/hour. The flow rate and pressure in the enclosure are precisely maintained using a pressure regulator, flow-control valves and a pressure gauge.

Advantageously, the slight overpressure, precisely maintained, of the low flow purge in accord with a preferred embodiment may prevent the strain on optical surfaces that a high flow, high pressure purge or a vacuum would produce. Fluctuations of the refractive index with pressure in the enclosure may also be reduced in accord with this embodiment. When it is particularly desired to have low refractive index fluctuations along the beam path, then a vacuum may be maintained within at least selected portions of the enclosure (see U.S. patent application Ser. No. 10/110,662, which is assigned to the same assignee as the present application and is hereby incorporated by reference). Moreover, turbulences typically observed with high flow purges are avoided using a low purge gas flow rate or vacuum, and the rate of contamination deposition on optical surfaces is generally reduced according to this embodiment.

An attenuator 54 may be preferably positioned before the detector 49 to control the intensity of the incoming light at the sensitive detector 49. The attenuator preferably includes a mesh filter. In addition to or in lieu of the attenuator 54, the system may include a DUWUV light to visible or near UV light coating on the detector 49 such as may be described at any of U.S. Pat. No. 6,327,284 and 6,389,048, which are hereby incorporated by reference.

FIG. 14a shows a $F_2$ laser system including a blue or green reference laser 56 for emitting a blue or green beam 57 for wavelength calibration in accord with a preferred embodiment. Wavelength calibration techniques using a reference beam 57 and coupling the reference beam 57 with a beam portion 60 of the main laser beam 20 into a spectrometer (not shown) are set forth at U.S. Pat. No. 6,160,831 and 5,373,515, each of which is hereby incorporated by reference. These techniques might typically use the red emission of a He-Ne laser (which has two lines at 633 nm and 543 nm) for performing this wavelength calibration. However, the red emission (around 630–780 nm) of the $F_2$ laser can hinder those techniques in at least two ways. First, it may be desirable to reflect out or otherwise filter the red emission from the $F_2$ laser from the main beam portion 60 to improve the spectrometric performance. Second, it may be difficult to resolve a red reference beam from the red emission of the $F_2$ laser during the spectrometry.

For each of these reasons, a blue or green reference beam 57 is used advantageously in accord with a preferred embodiment herein. A solid-state diode laser that emits blue or green light (e.g., below 550 nm, and preferably below 500 nm) is preferably used to generate the reference beam 57. The red emission from the $F_2$ laser can then be filtered or reflected out from the main beam portion 60 without affecting the reference beam 57. Also, the blue or green light (e.g., preferably having a wavelength below 550 nm) of the reference beam 57 can be easily resolved from the red emission (e.g., around 630 nm and above) of the $F_2$ laser.

FIG. 14b shows a $F_2$ laser system for beam alignment stabilization in accord with a preferred embodiment. A reference beam 57 is emitted from a blue or green laser, such as a solid state diode laser, a krypton-ion laser, etc., and the main beam 20 is redirected by the reflectors 62 and 64 to be collinear with the reference beam 57. Other methods are possible and may be understood by persons of ordinary skill in the art. The alignment of the main beam 20 is stabilized using the reference beam 57 as a beam guide. Advantageously, the red emission doesn't disturb the use of the reference beam, as discussed above with respect to FIG.

14a. Other beam alignment techniques that may be used with a $F_2$ laser system according to a preferred embodiment are described at U.S. Pat. No. 6,014,206, which is hereby incorporated by reference.

FIGS. 15a–15c illustrate a discharge chamber for a $F_2$ laser in accord with a preferred embodiment. As noted, it is desired to operate the $F_2$ laser at high repetition rates (e.g., more than 1 kHz, e.g., 2 4, 6 or 8 kHz and above). To achieve this, the clearing ratio, or the gas flow rate (v) through the discharge area divided by the discharge width (d), or v/d, has to be improved over that which was sufficient at lower repetition rates (e.g., 600–1000 Hz). This is because preferably substantially all of the gas within the discharge volume at the time of a previous discharge moves out of the discharge volume and is replaced by fresh gas prior to the next discharge.

So, for a $F_2$ laser (or an ArF or a KrF laser) having a preferred repetition rate of 2–4 kHz or more, the clearing ratio to achieve the just stated object would be 2000=v/d, or a value twice as large as for a laser having a repetition rate of 1 kHz. Thus, either the gas flow rate v may be increased (without enhanced turbulence) or the discharge width d may be reduced to increase the clearing ratio. Both of these are achieved in accord with a preferred embodiment. Preferably, this preferred embodiment incorporates the discharge chamber design and electrode configuration set forth at U.S. patent application Ser. No. 09/453,670, which is assigned to the same assignee as the present invention, and which is hereby incorporated by reference. Some preferred details are set forth below and shown in FIGS. 15a–15c, and alternative embodiments are described in the '670 application.

FIG. 15a illustrates the preferred embodiment relating to the shape of the main discharge electrodes 68 and 70, and the design of the discharge chamber 2 itself. The shapes of the main discharge electrodes 68 and 70 significantly effect characteristics of the discharge area 72, including the discharge width d. Therefore, at least one, and preferably both, of the electrodes 68 and 70 includes two regions. One of these regions, the center portion 74, substantially carries the discharge current and provides a uniform and narrow gas discharge width. The other region, or base portion 76, preferably in collaboration with other conductive and dielectric elements within the discharge chamber, creates preferred electrical field conditions in and around the discharge area 72 and also contributes to the smoothness and uniformity of the gas flow in the vicinity of the discharge electrodes 68 and 70.

The center portions 74 and base portions 76 preferably form electrodes 68 and 70 each having a single unit construction, and composed of a single material. The center and base portions 74 and 76 may also comprise different materials, but the different materials should have compatible mechanical and thermal properties such that mechanical stability and electrical conductivity therebetween is sufficiently maintained. The center portion 74 and the base portion 76 come together at a discontinuity or irregularity in the shape of the electrodes 68 and 70. A significant deviation of the electrical field occurs at the location of the irregularity in such a way that gas discharge occurs substantially from/to the center portions 74 drastically reducing the discharge width.

The center portions 74 are shaped to provide a uniform gas discharge having a narrow width. The base portions 76 may be shaped according to any of a variety of smooth curves or a combination of several smooth curves including those described by circular, elliptical, parabolic, or hyperbolic functions. The curvatures of the base portions 76 may be the same or different, and have the same direction of curvature with respect to the discharge area 72, i.e., the base portions 76 each curve away from the discharge area 72 away from the center portion 74. Alternatively, the base portion 76 of the high voltage main electrode 70 may have opposite curvature to the base portion 76 of the electrode 68. That is, the base portion 76 of the electrode 70 may curve toward the discharge area 72, while the base portion 76 of the electrode 68 curves away from the discharge area 60. The alternative configuration provides an even more aerodynamic channel for gas flow through the discharge area 72 because the electrode shapes both conform with the shape of the gas flow.

The electrodes 68 and 70 may alternatively have a regular shape and no discontinuity between base and center portions 74 and 76. The shape of the center portions 74 of the electrodes 68 and 70 in this alternative configuration is preferably similar to that described above and shown. However, the base portions 76 taper to the center portions in a triangular shape where the apexes of the triangular shaped based portions 76 are the center portions and are rounded as described above.

FIG. 15a also shows a pair of preferred spoilers 80 in accord with a preferred embodiment. The spoilers 80 are preferably integrated with the chamber at the dielectric insulators 82 on either side of the discharge area 72. The spoilers 80 may be integrated parts of a single unit, single material dielectric assembly with the insulators 82, or they may comprise different materials suited each to their particular functions. That is, the spoilers 80 and the dielectric insulators 82 may be formed together of a common material such as ceramic to provide an aerodynamic laser chamber 2 for improved gas flow uniformity. Alternatively, the spoilers 80 may be attached to the insulating members 82.

The spoilers 80 are aerodynamically shaped and positioned for uniform gas flow as the gas flows through the chamber 2 from the gas flow vessel 84 (partially shown), through the discharge area 72 and back into the gas flow vessel 84. Preferably, the spoilers 80 are symmetric in accord with a symmetric discharge chamber design.

One end 86 of each of the spoilers 80 is preferably positioned to shield a preionization unit 88 from the main electrode 68, and is shown in FIG. 15a extending underneath one of the pre-ionization units 88 between the preionization unit 88 and the main electrode 68. These ends 86 of the spoilers 80 are preferably positioned close to the preionization units 88. For example, the ends 86 may be just a few millimeters from the preionization units 88. By shielding the preionization units 88 from the main electrode 68, arcing or dielectric breakdown between the preionization units 88 and the main electrode 68 is prevented. The spoilers 80 serve to remove gas turbulence zones present in conventional discharge unit electrode chambers which occur due to the sharp curvature of the gas flow in the vicinity of the preionization units 88 and of the grounded discharge electrode 68.

FIGS. 15b–15c illustrate another feature in accord with a preferred embodiment. As discussed above, the dielectric insulators 82 of the electrode chamber isolate the high voltage main electrode 70. The gas flow is crossed by a first rib configuration 92a of a current return bar, where the gas flow enters the electrode chamber 2 from the gas flow vessel 84 and by a second rib configuration 92b of the current return bar where the gas flow exits the electrode chamber 2 and returns the gas back into the gas flow vessel 84. The ribs 94a, 94b, which as mentioned are current return bars, are separated by openings for the laser gas to flow into and out of the electrode chamber 2 from/to the gas flow vessel 84.

The ribs 94a, 94b are preferably rigid and conducting, and are connected to the grounded main discharge electrode 68 to provide a low inductivity current return path. The conducting ribs 94a of the rib configuration 92a are preferably substantially shaped as shown in FIG. 15b. The conducting ribs 94b of the rib configuration 92b are preferably substantially shaped as shown in FIG. 15c. The ribs 94a and 94b of the rib configurations 92a and 92b, respectively, are asymmetrically shaped.

FIG. 15b is a cross sectional view A—A of the rib configuration 92a through which the laser gas enters the electrode chamber 2 from the gas flow vessel 84. The ribs 94a of the rib configuration 92a each have a wide upstream end that meets the laser gas as it flows from the gas flow vessel 84, and a narrow downstream end past which the laser gas flows as it enters the discharge chamber. Preferably, the ribs 94a are smoothly tapered, e.g., like an airplane wing, from the wide, upstream end to the narrow, downstream end to improve gas flow past the rib configuration 92a.

FIG. 15c is a cross sectional view of the rib configuration 92b through which the laser gas exits the electrode chamber 2 and flows back into the gas flow vessel 84. The ribs 94b of the rib configuration 92b each have a wide upstream end which meets the laser gas as it flows from the electrode chamber 2, and a narrow downstream end past which the laser gas flows as it enters the gas flow vessel 84. Preferably, the ribs 94b are smoothly tapered, e.g., like an airplane wing, from the wide, upstream end to the narrow, downstream end to improve gas flow past the rib configuration 92b.

The aerodynamic ribs 94a and 94b each provide a reduced aerodynamic resistance to the flowing gas from that provided by conventional rectangular ribs. Together, the effects of the aerodynamic spoilers 80 and the aerodynamic ribs 94a and 94b permit the flow rate of the gas through the chamber 2 to be increased without excessive turbulence. The increased gas flow rate through the discharge area 72, together with the reduced discharge width provided by the advantageous design of the electrodes 68 and 70, results in an increased clearing ratio in accord with high repetition rates of operation of the $F_2$ laser, and/or of ArF and KrF lasers, according to a preferred embodiment.

FIG. 16a shows a $F_2$ laser resonator for providing a substantially polarized output beam in accord with a preferred embodiment. First, Brewster windows 95 are preferably provided on the laser chamber 2 ideally exhibiting 100% transmission of π-polarized light and having a lower transmissivity of ρ-polarized light. As discussed, for lasers wherein the beam undergoes a large number of roundtrips, this effect of using the Brewster windows 95 substantially serves to polarize the beam. However, for the $F_2$ laser in particular, wherein only 1–2 roundtrips or less occur, the polarization may not be as high as desired. Thus, other optical elements may be aligned at Brewster's angle such as prisms, etalons, grisms, etc. for higher polarization. In addition, a thin film polarization plate 96 is shown in FIG. 16a for providing the desired polarization, e.g., above 95%, and for some applications there may be a still higher desired polarization such as 98% or above.

Figure 16B:
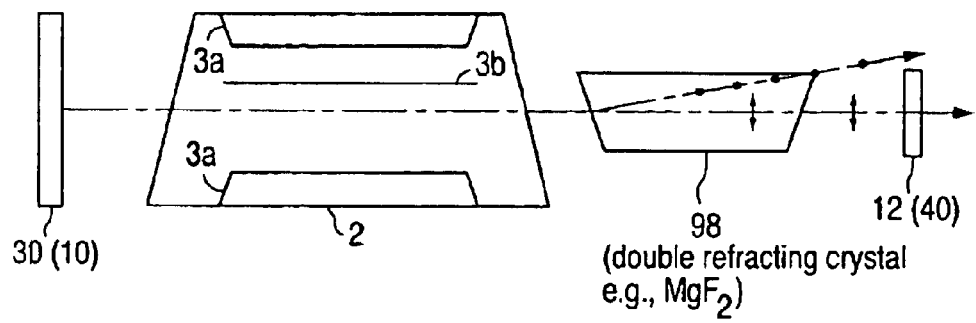
FIG. 16b shows a $F_2$ laser resonator for providing a substantially polarized beam in accord with a preferred embodiment.

FIG. 16b shows a $F_2$ laser resonator for providing a substantially polarized beam in accord with a preferred embodiment. FIG. 16b shows a laser resonator including a double refraction crystal or prism 98 for polarizing the beam. As shown at FIG. 16b, a double refracting crystal 98 comprising a birefringent material such as $MgF_2$ is used to refract one polarization component out of the resonator. In this regard, alternative configurations may be found at U.S. patent application Ser. No. 09/883,127, which is assigned to the same assignee as the present application and is hereby incorporated by reference. The double refracting crystal 98 may be used as an output coupler, as well. Also, the double refracting crystal 98 may have beam entrance and/or exit surfaces aligned at Brewster's angle to the beam for additionally improved polarization performance.

Figure 16D:
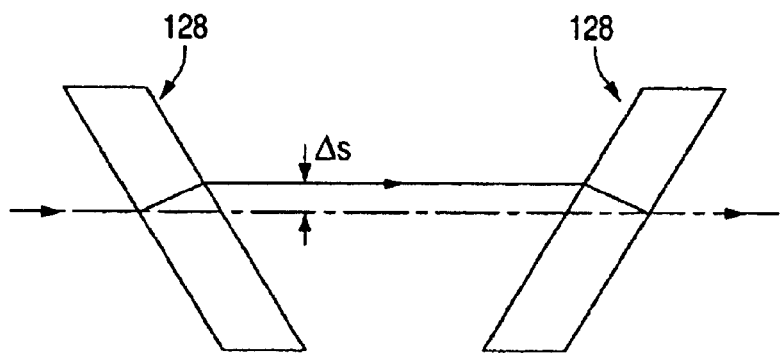
FIG. 16d schematically shows an arrangement according to a preferred embodiment including the Brewster plates 128 of FIG. 16c oppositely oriented, with each being aligned substantially at Brewster's angle to the beam path.
Figure 16F:
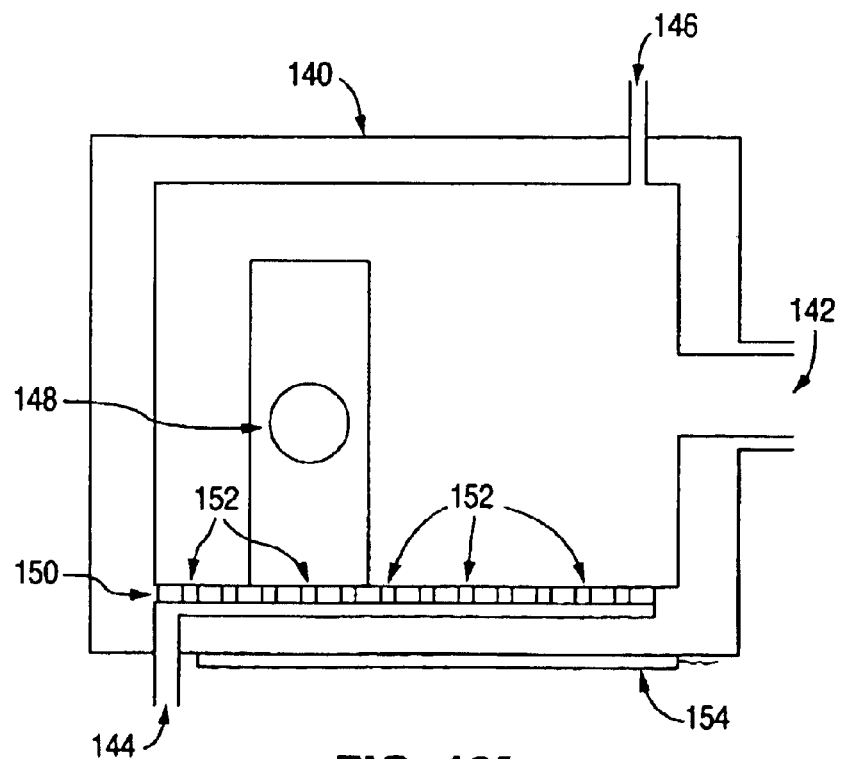
FIG. 16f shows an optics module for an excimer or molecular fluorine laser in accord with a preferred embodiment.
Figure 16C:
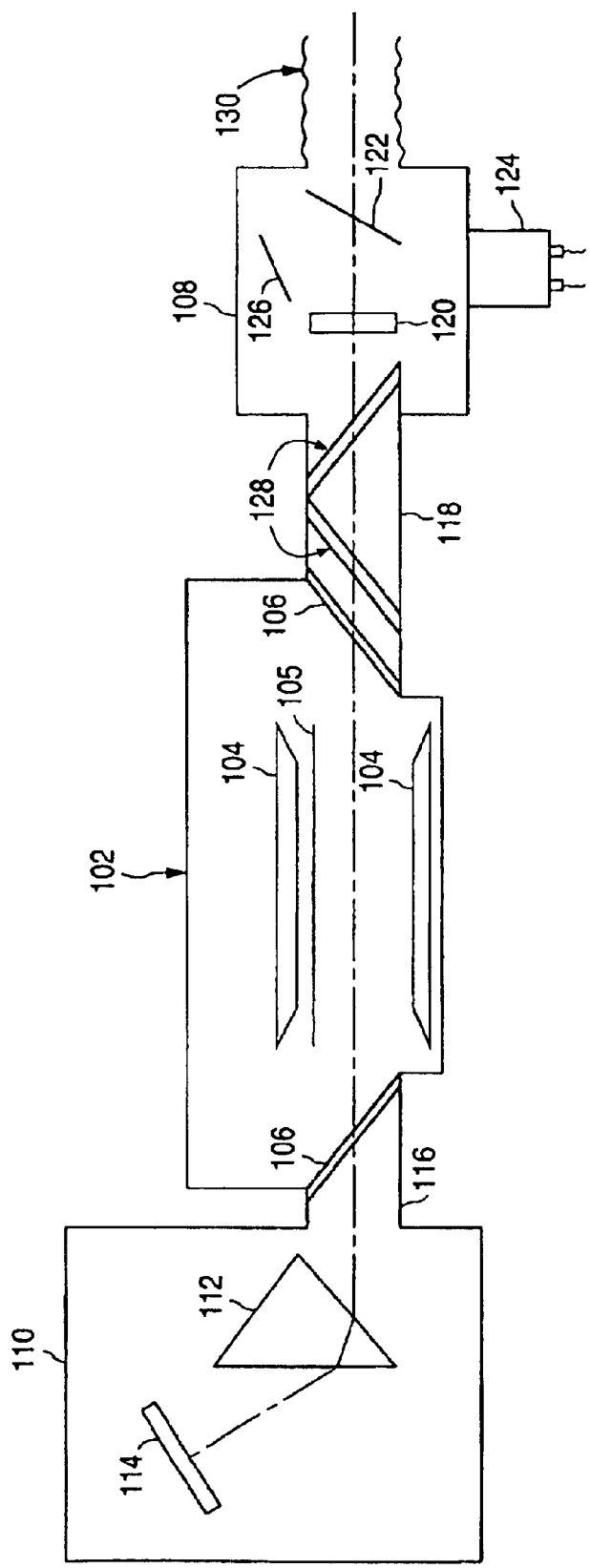
FIG. 16c shows a $F_2$ laser resonator for providing a substantially polarized beam in accord with a preferred embodiment.

FIG. 16c shows a $F_2$ laser resonator for providing a substantially polarized beam, such as being 95% polarized or more, depending on the requirements of a particular industrial application, in accord with a preferred embodiment. The laser resonator shown in FIG. 16c is preferably for coupling with other components, such as those described with respect to FIG. 2 above, to form an overall $F_2$ laser system for industrial processing, e.g., photolithography, photoablation, micro-machining or another processing application known to those skilled in the art. Those components may include a solid state pulser module and a high voltage power supply, a gas handling module, a control processor, a diagnostic module, and an optics control module, as shown and described with respect to FIG. 2. Other features of the above embodiments described with reference to FIGS. 3a–16b above may be included in the resonator shown in FIG. 16c.

The resonator shown includes a discharge chamber 102 which is preferably filled with a gas mixture including molecular fluorine and a buffer gas of preferably neon and/or helium, such as may be described in the U.S. Pat. No. 6,157,662 patent, incorporated by reference above. A trace gas additive may be included of, e.g., xenon, krypton or argon or another element listed in the Ser. No. 09/513,025 application, incorporated by reference above. A pair of main electrodes 104 are shown for connecting with a discharge circuit (not shown) for energizing the gas mixture. One or more preionization electrodes 105 are also preferably within the discharge chamber 102, preferably of corona or sliding surface discharge type, for ionizing the gas mixture prior to main discharges, such as may be described in the Ser. No. 09/692,265 and 09/532,276 applications, incorporated by reference above. An overall laser tube preferably also includes a blower for circulating the gas mixture and a heat exchanger for controlling the temperature of the gas mixture during operation (see U.S. patent applications No. 09/823,298 and 10/112,070, which are assigned to the same assignee as the present application and are hereby incorporated by reference).

A pair of Brewster windows 106 are shown in FIG. 16c sealing the discharge chamber 102 and providing some polarization of light exiting and entering the discharge chamber 102. The resonator of FIG. 16c also includes a front optics module 108 and a rear optics module 110. The optics modules 108, 110 may include any of the optics described above or others described in any of the patents, patent applications or other references incorporated by reference herein, or other optics as understood by one skilled in the art. A dispersion prism 112 is shown disposed within the rear optics module 110 as an example of an optical element that may be used for selecting one of the molecular fluorine emission lines around 157 nm, such as by dispersing away the line around 157.5 nm and selecting the line around 157.6 nm. Another element or elements, in addition to or instead of the prism shown, such as a grating, etalon, another type of interferometric device (e.g., having non-plane-parallel inner reflecting surfaces, see the '883 application cited above), and/or a grism with or without a beam expander such as may include one or more and preferably multiple beam expanding prisms or corresponding reflective elements according to Babinet's principle, or otherwise such as those described above or as understood by those skilled in the art, may be used for this purpose.

The rear optics module 110 shown also includes a highly reflective mirror 114 for reflecting selected light back into the discharge chamber 102. The rear optics module 110 is enclosed such that photoabsorbing species such as oxygen and water vapor do not contaminate the environment therein. The rear optics module 110 may be purged with a stagnant or flowing inert gas, or may be evacuated, although inlet/outlet and/or evacuation ports are not shown in FIG. 16c (see the Ser. No. 10/112,660 application, incorporated by reference above). The rear optics module 110 is shown coupled to the discharge chamber 102 by an enclosure 116 such as was described with reference to FIG. 13, again for keeping the beam path free of photoabsorbing species. The atmosphere may be purged with nitrogen and maintained at a slight overpressure, such as 1.01 bar or just greater than the pressure outside the module 110. The atmosphere preferably contains less than 0.4 ppm oxygen, less than 0.1 ppm water vapor and less than 0.1 ppm hydrocarbons. The enclosures 116, 118 and 130 (see below) may be stainless steel bellows, and DN40 flanges may be used.

The front optics module 108 shown is also enclosed within a protective environment, and is coupled to the discharge chamber by an enclosure for keeping the beam path free of photoabsorbing species. As with the rear optics module 110, the front optics module 108 may be filled with a stagnant or flowing inert gas, or may be evacuated, although the port or ports are not shown in FIG. 16c. An output coupler 120 is shown disposed within the front optics module 120. The output coupler may be an uncoated $CaF_2$ plate having a reflectivity of less than 25%, and more preferably may be around 6% or 8% or so. The output coupler 120 may include one of the optical components described above such as a prism, grism, transmission grating, birefringent block, etalon or other interferometric device, or simply a partially reflecting mirror. The output coupler 120 may be replaced with a highly reflective resonator reflector, while output coupling of the laser beam may be performed by another intracavity component such as a partially reflective surface of another optic within the resonator.

A beam splitter 122 is shown for reflecting a beam portion along an optical path leading to a detector 124 for monitoring the energy of the beam. Optics for monitoring the wavelength, amplified spontaneous emission, bandwidth, spectral purity, temporal beam profile, spatial beam profile or other parameter or parameters of the beam may also be included in the overall laser system, but are not shown in FIG. 16c (see, e.g., U.S. Pat. Nos. 6,243,405, 6,327,284, 6,389,048, 6,285,701, 4,905,243 and 6,243,406, and U.S. patent applications Ser. No. 09/923,632 and 09/780,124, which are assigned to the same assignee as the present application, and wherein each of these patents and patent applications is hereby incorporated herein by reference). The beam splitter 122 is shown for directing the beam portion to a mirror 126 which reflects the beam portion to the detector 124. An optic or optics for suppressing the red light contribution of the beam portion that reaches the detector 124 may also be included such as a dispersive element, dichroic mirror(s) and/or an aperture (see U.S. patent applications Ser. No. 09/712,877, 09/718,809 and 09/598,552, which are assigned to the same assignee as the present application and are hereby incorporated by reference).

A pair of Brewster plates 128 are shown disposed within the enclosure 118 between the Brewster window 106 and the front optics module 108. As understood by those skilled in the art, the Brewster plates 128 are oriented with surfaces aligned at Brewster's angle to the beam path, which for VUV light is around 56°. The Brewster plates 128 may alternatively be immersed within the gas mixture in the discharge chamber 102, or may be on the other side of the discharge chamber 102 within the enclosure 116 near the rear optics module 110. One or more Brewster plates 128 may be disposed on either side of the discharge chamber 102 or immersed within the gas mixture. One or more Brewster plates 128 may also be located outside the laser resonator after the output coupler 120. There may be only one Brewster plate 128 or more than two, such as three, Brewster plates 102 used in alternative embodiments.

Two or three Brewster plates 102 are preferred for achieving a balance between providing a substantially polarized beam, e.g., being 95% polarized or better, and for some applications a polarization of 98% or more may be desired, and not suppressing laser power by losses incurred when the beam traverses the plates 128 in the resonator. For example, if only one Brewster plate 128 is used, the beam may not be 95% polarized or better in some embodiments, although one Brewster plate 128 may be sufficient depending on the polarization produced by other components such as Brewster prisms that may be disposed within the resonator. On the other hand, if four or more Brewster plates 128 are used, then the power of the beam may be suppressed too much such that electrical pulses of undesirably high intensities would have to be applied to the electrodes 104 to produce output laser pulses at desired energies, although four or more Brewster plates 128 may provide a higher polarization which may be desired in some applications while the application of the greater power may be tolerable under those circumstances, or an amplifier may be used such as may be described at any of U.S. Pat. No. 6,381,256, 6,381,257 and 6,370,174, and/or U.S. patent applications No. 60/309,939 and 09/923,770, which applications are each assigned to the same assignee as the present application, each of these patents and patent applications being hereby incorporated by reference.

The pair of Brewster plates 128 shown are oppositely oriented such that they are not disposed with surfaces in parallel to each other. The plates 128 may, however, be disposed in parallel to each other. One advantage of oppositely orienting the Brewster plates 128 is illustrated in FIG. 16d. FIG. 16d schematically shows an arrangement according to a preferred embodiment including the Brewster plates 128 of FIG. 16c oppositely oriented, with each being aligned substantially at Brewster's angle to the beam path. As can be seen in FIG. 16d, an alignment of the beam is moved a distance Δs from its original path as a consequence of traversing the first Brewster plate 128 from the left. In order to move the beam back to its original path (i.e., back to its original vertical position in FIG. 16d), the second Brewster plate 128 to the right of the first Brewster plate 128 in FIG. 16d is oppositely oriented to the first plate 128 (i.e., symmetrically oriented about a vertical axial plane equidistant from each plate at each point along the vertical direction in FIG. 16d), rather than in parallel with the first plate 128, for compensating the shift Δs of the beam. If instead the plates 128 were oriented in parallel, the beam would be shifted by 2Δs, which could be accommodated in this alternative embodiment by shifting other components of the front optics module 108 of FIG. 16c also by 2Δs. An advantage of oppositely orienting the plates 128 is that the plates 128 may be inserted into an already constructed resonator, e.g., that had been previously built, ordered, designed, etc., without contemplating use of the Brewster plates 128, without having to adjust components of the front optics module 10B. If three Brewster plates 128 are used, then some adjustment would be made (i.e., by 3Δs or preferably 1Δs according to FIG. 16e).

One of the Brewster plates 128 or a third Brewster plate (not shown) may serve as a window on the front or rear optics module 108, 110, i.e., when a separate window is used in addition to the window 106 on the discharge chamber 102. Another Brewster plate (not shown) may serve as a window between the enclosure 130 at the other end of the front optics module 108 or otherwise at an outcoupling beam path enclosure of the laser system, for sealing the enclosure 130 from an imaging system enclosure or other component that receives the outcoupled beam for imaging or otherwise for industrial processing using the beam. Alternative beam path enclosure configurations are set forth in U.S. Pat. No. 6,327,290 and U.S. patent applications Ser. No. 09/598,552 and 09/718,809, which are assigned to the same assignee as the present application, each of which is hereby incorporated by reference, and a Brewster window may be used to separate any two beam path extents for further polarizing the beam.

The Brewster plates 128 are preferably made of calcium fluoride ($CaF_2$), and alternatively of $MgF_2$, $BaF_2$, $SrF_2$, LiF or another material having substantial transmissivity around 157 nm. The plates 128 are preferably uncoated, but may have an antireflection and/or protective coating or otherwise on one or both surfaces.

Figure 16E:
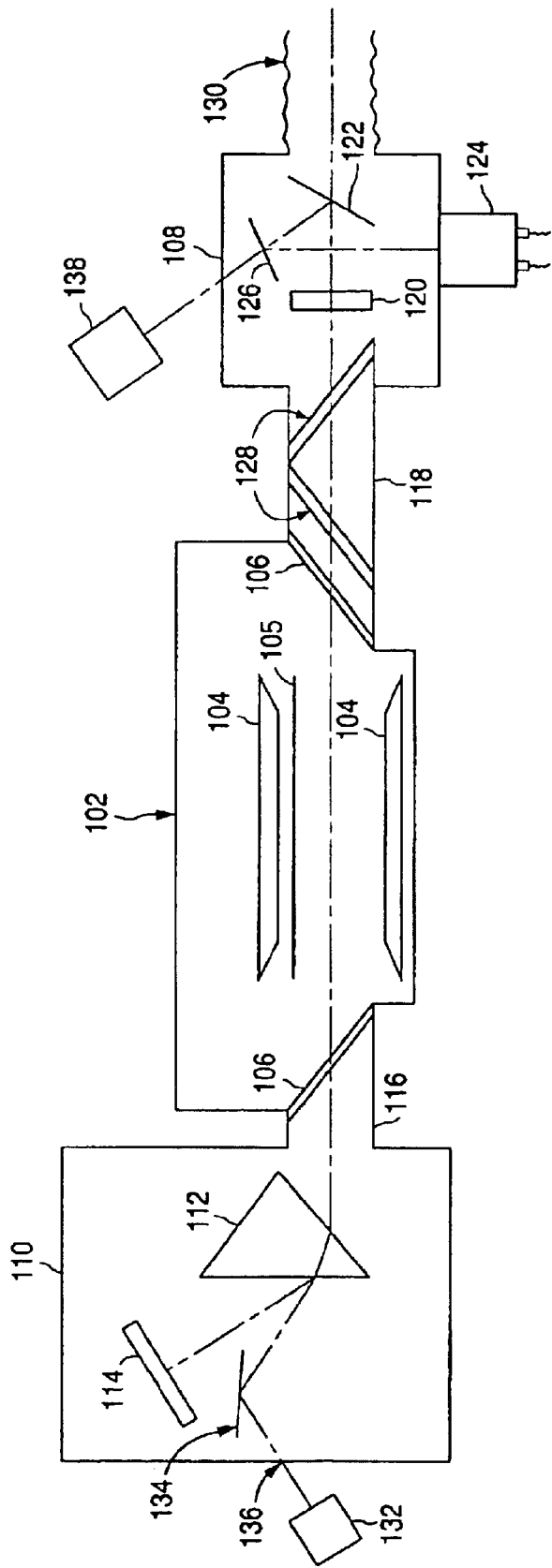
FIG. 16e schematically shows the laser resonator of FIG. 16c also having a probe beam analyzer for monitoring polarization, other beam parameters and/or alignment of resonator optics.

FIG. 16e schematically shows the laser resonator of FIG. 16c also having a probe beam analyzing system for monitoring polarization, other beam parameters and/or alignment of resonator optics. Although the probe analyzing system shown in FIG. 16e is described below with regard to its advantageous use with a molecular fluorine laser system, the probe beam analyzing system may be used for other laser systems such as KrF or ArF excimer laser systems.

The probe beam analyzing system shown in FIG. 16c includes a probe beam source 132 for emitting a probe beam 136, preferably in the blue or green region of the electromagnetic spectrum for the reasons set forth above with respect to FIGS. 14a–14b, and the wavelength is selected for being transmittable through the resonator components of the laser system. The probe beam source 132 is preferably a laser, such as a HeNe or HeCd laser, and may alternatively be a lamp, such as a Hg lamp. A mirror 134 is shown for reflecting the beam 136 emitted by the laser 132 in a direction for propagating the beam 136 along the optical path of the resonator through the discharge chamber 102. Alternatively, the laser source 132 may be disposed to emit the beam directly in a direction for propagating the beam 136 along the optical path of the resonator through the discharge chamber 102. The beam 136 preferably traverses the polarizing elements 128 and is shown reflecting from the beam splitter 122. The probe beam 136 is preferably transmitted at the VUV reflecting beam splitter 126 and into a detector 138.

The detector 138 may be a configured to measure the polarization of the beam such as by including polarization filtering optics before a photodiode. The detector 138 may be simply a photodiode for measuring an intensity of the probe beam 136 incident at the detector 138. The detector 138 may be a position sensitive diode, such as a multidiode detector containing two or four diode elements for monitoring an alignment of the beam. The detector 138 may be a diode array for measuring a beam profile or otherwise for measuring the width of the probe beam for testing a quality of optics such as the line-narrowing optics 112. Each of these types of detectors 138 may be interchangeable so that each of these parameters may be measured by putting the appropriate one of these detectors 138 into the system at different times. One or more beam splitters may be used for reflecting portions of the probe beam 136 to multiple detectors 138 for measuring multiple parameters either simultaneously or such that multiple parameters may be measured without interchanging the detectors 138.

The probe beam analyzing system may be alternatively configured than as shown in FIG. 16e. For example, the probe beam laser source 132 and detector 138 may be interchanged. Also, the probe beam detector 138 may be positioned to receive the probe beam 136 reflected from another surface such as one of the Brewster plates 128 or a window 106 or a surface of a line-narrowing optic 112 such as a prism. An additional beam splitter may be used to reflect the probe beam 136 to the detector 138 such as may be disposed after the beam splitter 122.

The probe beam analyzing system may be configured such that the probe beam 136 does not traverse the discharge chamber 102. For example, the probe beam source 132 may be disposed such that the probe beam 136 traverses the line-narrowing and/or selection unit 112 and then the detector 138 may be disposed to receive a beam portion reflected from the window 106 on the discharge chamber 102 on the left side of the discharge chamber 102 shown in FIG. 16e, such as to monitor the quality of the line-narrowing optics 112. The wavelength, in this case, of the probe beam may be around the laser wavelength or otherwise as described above. In another example, the probe beam source 132 may be disposed to emit a beam that is reflected at one of the windows 106 to propagate in a direction away from the discharge chamber to be received at the detector 138 for monitoring optics of the front or rear optics modules 108 or 110, or optics disposed within one of the enclosures 116 or 118.

The preferably blue or green probe beam 136 will refract through the dispersive element or elements 112 at a different angle than the ultraviolet emission of the molecular fluorine laser so that the probe beam source 132 and mirror 134 may be advantageously disposed such as to not interfere with the laser beam itself. In this way, and although the probe beam analyzing system may be used when the laser is not operating, the probe beam analyzing system may also be used for monitoring one or more of the above-mentioned parameters while the molecular fluorine laser (or ArF, KrF, or XeCl laser, EUV lithography source, etc.) system is operating, and may even be used while the VUV laser beam is being used for industrial processing.

FIG. 16f shows an optics module for an excimer laser, such as a KrF or ArF laser, or for a molecular fluorine laser, in accord with a preferred embodiment. The illustrated optics module is a rear optics module, but may have a beam port on the left side of the module shown in FIG. 16f such as to be used as a front optics module according to the resonator orientations being schematically used herein.

The optics module of FIG. 16f includes a housing 140 having a beam entrance/exit port 142 leading to/from a discharge chamber (not shown). The housing 140 of FIG. 16f has two additional ports 144 and 146 for inlet and outlet of an inert gas purge. One or more additional ports may be included to provide further homogeneity of gas flow through the module. An optic 148 is shown mounted on a mounting plate 150. The mounting plate 150 is preferably specially designed to flow the inert gas coming in through the inlet port 144 into the interior of the housing 140 through several small openings 152 that are preferably arranged like a grid over the substantial area of the mounting plate 150. The design of the mounting plate 150 may be similar to that of a shower head for allowing the inert gas to flow into the interior of the housing 140 in several small streams dispersed substantially evenly over the area of the mounting plate 150. The flow of inert gas into the interior of the housing 140 is advantageously homogenized due to the special design of the mounting plate 150 and by configuring the inlet port 144 to flow the inert gas through the small openings 152 in the mounting plate 150. A second grid like structure may be used to outlet the gas at the top of the housing opposite the mounting plate 150. The inert gas may also be flowed into the housing through a grid-like inlet at the top of the housing, while the outlet may be a single port or may be as the mounting plate 150 is shown in FIG. 16f.

A heater plate 154 is also shown coupled to the housing 140. One or more temperature sensors (not shown) may be disposed within the interior of the housing 140 and a temperature controller (also not shown) may be used in conjunction with the heater 154 for controlling a temperature within the interior of the housing 140. Means for cooling the interior of the housing 140 may also be used such as by cooling the inert gas before flowing the inert gas into the housing 140 through the port 144 or 146, or cooling water tubes may be coupled to the housing 140 or otherwise as understood by those skilled in the art; the idea being to be able to set and control the temperature within the housing at approximately a selected temperature which at least provides an advantage of reduced thermal fluctuations of the refractive index of the gas, and where reduction of such refractive index fluctuations is greatly desired, the housing 140 may alternatively be substantially evacuated (see U.S. patent application Ser. No. 60/281,433, which is assigned to the same assignee as the present application and is hereby incorporated by reference).

While exemplary drawings and specific embodiments of the present invention have been described and illustrated, it is to be understood that that the scope of the present invention is not to be limited to the particular embodiments discussed. Thus, the embodiments shall be regarded as illustrative rather than restrictive, and it should be understood that variations may be made in those embodiments by workers skilled in the arts without departing from the scope of the present invention as set forth in the claims that follow, and equivalents thereof.

In addition, in the method claims that follow, the operations have been ordered in selected typographical sequences. However, the sequences have been selected and so ordered for typographical convenience and are not intended to imply any particular order for performing the operations, except for those claims wherein a particular ordering of steps is expressly set forth or understood by one of ordinary skill in the art as being necessary.

What is claimed is:

1. A $F_2$ laser, comprising:
    a laser resonator including therein a discharge chamber filed with a laser gas mixture including molecular fluorine for generating a spectral emission, the spectral emission including a plurality of emission lines in a wavelength range between 157 nm and 158 nm, the plurality of emission lines including a first emission line centered around 157.62 nm and a second emission line centered around 157.52 nm;
    a plurality of electrodes within the discharge chamber connected with a power supply circuit or energizing the molecular fluorine and generating a laser beam in the laser resonator, the laser beam containing the spectral emission;
    a transmission diffraction grating positioned along the laser beam in the laser resonator, the transmission diffraction grating positioned so as to transmit only one of the fit and second emission lines; and
    one or more polarization elements positioned in the laser resonator along the laser beam, wherein each polarization element is aligned at an angle relative to the laser beam such that at least 95% of an output beam transmitted by the one or more polarization elements has the same polarization, the 95% polarized output beam containing said one of the first and second mission lines transmitted by the transmission diffraction grating.

2. The laser of claim 1, wherein the discharge chamber is sealed by windows aligned at an angle relative to the output beam such that the windows transmit a greater percentage of a component of the beam having said same polarization.

3. The laser of claim 2, wherein the windows are Brewster windows.

4. The laser of claim 1, wherein each of the polarization elements is a Brewster plate.

5. The laser of claim 1, wherein the one or more polarization elements includes a first plate and a second plate, and wherein the first and second plates are oppositely aligned to compensate a beam path offset when the laser beam traverses the first and second plates.

6. A $F_2$ laser, comprising:
    a laser resonator including therein a discharge chamber filled with a laser gas mixture including molecular fluorine for generating a spectral emission, the spectral emission including a plurality of emission lines in a wavelength range between 157 nm and 158 nm, the plurality of emission lines including a first emission line centered around 157.62 nm and a second emission line centered around 157.52 nm;
    a plurality of electrodes within the discharge chamber connected with a power supply circuit for energizing the molecular fluorine and generating a laser beam in the laser resonator, the laser beam containing the spectral emission;
    a transmission diffraction grating positioned along the laser beam in the laser resonator, the transmission diffraction grating positioned so as to transmit only one of the first and second emission lines;
    at least one window in the laser resonator for transmitting an output beam corresponding to the laser beam, the at least one window sealing the discharge chamber and aligned at an angle to the output beam such that the windows transmit a greater percentage of a first polarization component of the output beam than a second polarization component of the output beam; and
    one or more intracavity plates positioned in the laser resonator along the laser, each of the intracavity plates being aligned at an angle relative to the output beam such that each of the intracavity plates transmits a greater percentage of the first polarization component than the second polarization component, such that at least 95% of the output beam has a polarization corresponding to the first polarization component.

7. The laser of claim 6, wherein the at least one window includes at least one Brewster window.

8. The laser of claim 6, wherein each of the intracavity plates is a Brewster plate.

9. The laser of claim 6, wherein the one or more intracavity plates includes at last three intracavity plates.

10. The laser of claim 9, wherein at least 98% of the output beam has a polarization corresponding to the first polarization component.

11. The laser of claim 6, wherein the one or more intracavity plates includes a first plate and a second plate, and wherein the first and second plates are oppositely aligned to compensate a beam path offset when the laser beam traverses the plates.

12. A $F_2$ laser, comprising:

a laser resonator including therein a discharge chamber filled with a laser gas mixture including molecular fluorine for generating a spectral emission, the spectral emission including a plurality of emission lines in a wavelength range between 157 nm and 158 nm, the plurality of emission lines including a first emission line centered around 157.62 nm and a second emission line cell around 157.52 nm;

a plurality of electrodes within the discharge chamber connected with a power supply circuit for energizing the molecular fluorine and generating a laser beam in the laser resonator, the laser beam containing the spectral emission;

a transmission diffraction grating along the laser beam in the laser resonator, the transmission diffraction grating positioned so as to transmit only one of the first and second emission lines; and at least two intracavity plates positioned in the laser resonator along the laser beam, wherein each of the intracavity plates is aligned at an angle relative to the laser beam such that each of the plates transmits a greater percentage of a first polarization component of the laser beam than a second polarization component, such that the laser beam is 95% polarized in a direction corresponding to the first polarization component.

13. The laser of claim 12, wherein each of the plates is a Brewster plate.

14. The laser of claim 12, wherein the at least two intracavity plates includes at least three plates.

15. The laser of claim 14, wherein at least 98% of the laser beam has a polarization corresponding to the first polarization component.

16. The laser of claim 12, wherein the at least two intracavity plates includes a first plate and a second plate, and wherein the first and second plates are oppositely aligned to compensate a beam path offset when the laser beam traverses the plates.

17. A $F_2$ laser, comprising:

a laser resonator including therein a discharge chamber filled with a laser gas mixture including molecular fluorine for generating a spectral emission, the spectral emission including a plurality of emission lines in a wavelength range between 157 nm and 158 nm, the plurality of emission lines including a first emission line centered around 157.62 nm and a second emission line centered around 157.52 nm;

a plurality of electrodes within the discharge chamber connected with a power supply circuit for energizing the molecular fluorine and generating a laser beam in the laser resonator, the laser beam containing the spectral emission;

a transmission diffraction grating positioned along the laser beam in the laser resonator, the transmission diffraction grating positioned so as to transmit only one of the first and second emission lines;

at least two intracavity plates each intracavity plate aligned at an angle relative to the laser beam such that each of the intracavity plates transmits a greater percentage of a first polarization component of the beam than a second polarization component, such that 95% of the laser beam has a polarization corresponding to the first polarization component; and a front optics module in the laser resonator coupled with the discharge chamber through an enclosure such that an optical path of the laser beam between the discharge chamber and the front optics module is maintained substantially free of molecular species that photoabsorb around 157 nm, at least one of the intracavity plates being disposed within the enclosure.

18. The laser of claim 17, wherein the enclosure for coupling the front optics module with the discharge chamber is purged with an inert gas maintained at least at a slight overpressure for keeping the photoabsorbing molecular species from entering and contaminating the optical path of the laser beam.

19. The laser of claim 17, wherein the enclosure for coupling the front optics module with the discharge chamber is evacuated for maintaining the optical path substantially free of the photoabsorbing molecular species.

20. The laser of claim 17, wherein the discharge chamber is sealed by windows aligned at an angle to the laser beam such that the windows transmit a greater percentage of the first polarization component of the beam than the second polarization component.

21. The laser of claim 17, wherein the laser resonator includes a rear optics module coupled with the discharge chamber through a second enclosure such that an optical path of the laser beam between the discharge chamber and the rear optics module is maintained substantially free of molecular species that photoabsorb around 157 nm.

22. A $F_2$ laser, comprising:

a laser resonator including therein a laser tube filled with a laser gas mixture at least including molecular fluorine for generating a spectral emission, the spectral emission including a plurality of emission lines in a wavelength range between 157 nm and 158 nm, the plurality of emission lines including a first emission line centered around 157.62 nm and a second emission line centered around 157.52 nm;

a plurality of electrodes within the discharge chamber connected with a power supply circuit for energizing the molecular fluorine and generating a laser beam in the laser resonator, the laser beam containing the spectral emission;

a transmission diffraction grating positioned along the laser beam in the laser resonator, the transmission diffraction grating positioned so as to transmit only one of the first and second emission lines; and at least one intracavity polarizing element positioned in the path of the laser beam in the resonator such that at least 95% of the laser beam transmitted from the resonator has the same polarization.

23. The laser of claim 22, wherein the at least one polarizing element includes a polarization plate.

24. The laser of claim 22, wherein the discharge chamber is sealed by windows aligned at an angle to the laser beam such that the windows transmit a greater percentage of a first polarization component of the beam than a second polarization component.

25. The laser of claim 22, wherein the at least one polarizing element includes a double refraction prism comprising magnesium fluoride.

26. The laser of claim 25, wherein the double refraction prism has at least one surface selected from the group of surfaces including a beam entrance and a beam exit surface aligned at approximately Brewster's angle to the beam.

27. The laser of claim 26, wherein the double reaction prism also serves to output couple the beam from the laser resonator.

28. The laser of claim 25, wherein the at least one polarizing element further includes a polarization plate.

29. The laser or claim 27, wherein the discharge chamber is sealed by windows aligned at an angle to the output beam such that the windows transmit a greater percentage of a first polarization component of the beam than a second polarization component.

30. The laser of claim 25, wherein the double refraction prism also serves to output couple the beam from the laser resonator.

31. The laser of claim 22, wherein the discharge chamber is sealed by windows aligned at an angle to the laser beam such that the windows transmit a greater percentage of a first polarization component of the laser beam than a second polarization component for further polarizing the laser beam in conjunction with the at least one polarizing element.

32. The laser of claim 22, further comprising an energy detector module including an energy detector and beam splitter module provided in a sealed enclosure substantially free of molecular species that photoabsorb around 157 nm wherein a portion of the laser beam that is directed to the energy detector is directed along a beam path within the enclosure that is protected from being substantially attenuated by the photoabsorbing species, such that in operation of the $F_2$ laser, the energy detector detects the energy of the output beam portion by detecting the portion of the beam that is directed to the detector from the beam splitter module along the beam path within the enclosure and not substantially attenuated by the photoabsorbing species, wherein the beam splitter module of the energy detector module separates the laser beam portion from a main output laser beam for detection at the energy detector.

33. The laser of claim 32, wherein the energy detector module is coupled with a main enclosure for the output beam, such that the beam path of the separated beam portion to be detected at the energy detector is substantially free of the photoabsorbing species.

34. The laser of claim 32, further comprising an output coupler having at least one surface disposed within the energy detector module.

35. The laser of claim 32, wherein the discharge chamber is sealed by Brewster windows.

36. The laser of claim 32, wherein the discharge chamber is sealed by windows aligned at an angle to the output beam such that the windows to transmit a greater percentage of a first polarization component of the beam than a second polarization component.

37. The laser of claim 36, further comprising one or more intracavity plates, and wherein each of the plates is aligned at an angle to the output beam such that each of the plates transmits a greater percentage of the first polarization component of the beam than the second polarization component, and wherein at least 95% of the main output laser beam has the same polarization.

38. The laser of claim 37, wherein the one or more plates includes at least two plates.

39. The laser of claim 32, further comprising one or more intracavity plates, and wherein each of the plates is aligned at an angle to the output beam such that each of the plates transmits a greater percentage of the first polarization component of the beam than the second polarization component, and wherein the main output laser beam is polarized to at least 95% polarization.

40. The laser of claim 39, wherein the one or more plates includes at least two plates.

41. The laser of claim 22, wherein the laser resonator further includes a front optics module and a rear optics module coupled with the discharge chamber through enclosures such that an optical path of the laser beam is maintained substantially free of molecular species that photoabsorb around 157 nm, wherein the intracavity laser beam propagates along a beam path within the enclosure that is protected from being substantially attenuated by the photoabsorbing species, such that in operation of the $F_2$ laser, the output beam is generated within the resonator along the beam path within the enclosure and not substantially attenuated by the photoabsorbing species, such that a beam of substantial energy is output coupled from the resonator.

42. The laser of claim 41, wherein the front and rear optics modules and the enclosures for coupling the front and rear optics module with the discharge chamber are purged with an inert gas maintained at least at a slight overpressure for keeping the photoabsorbing molecular species from entering and contaminating the optical path of the laser beam.

43. The laser of claim 41, wherein the font and rear optics modules and the enclosures for coupling the front and rear optics module with the discharge chamber are evacuated for maintaining the optical path substantially free of the photoabsorbing molecular species.

44. The laser of claim 41, wherein the rear optics module is evacuated for maintaining the optical path substantially free of the photoabsorbing molecular species.

45. The laser of claim 41, wherein the enclosure coupling the rear optics module with the discharge chamber is in fluid communication with the rear optics module such that the enclosure is evacuated along with the rear optics module.

46. The laser of claim 41, wherein the discharge chamber is sealed by windows aligned at an angle to the output beam such that the windows transmit a greater percentage of a first polarization component of the beam than a second polarization component.

47. The laser of claim 46, further comprising one or more intracavity plates, and wherein each of the plates is aligned at an angle to the output beam such that each of the plates transmits a greater percentage of the first polarization component of the beam than the second polarization component, and wherein at least 95% of the main output laser beam has the same polarization.

48. The laser of claim 47, wherein the one or more plates includes at least two plates.

49. The laser of claim 41, further comprising one or more intracavity plates, and wherein each of the plates is aligned at an angle to the output beam such that each of the plates transmits a greater percentage of the first polarization component of the beam than the second polarization component, and wherein at least 95% of the main output laser beam has the same polarization.

50. The laser of claim 49, wherein the one or more plates includes at least two plates.

51. The laser of claim 50, wherein the at least two plates are each Brewster plates.

52. An excimer or molecular fluorine laser, comprising:
 a laser resonator including therein a laser tube filled with a laser gas mixture including molecular fluorine for generating an ultraviolet spectral emission;
 a plurality of electrodes within the discharge chamber connected with a power supply circuit for energizing the gas mixture and generating a laser beam in the laser resonator, the laser beam containing the ultraviolet spectral emission;

a transmission diffraction grating positioned along said laser beam such that only one emission line of the spectral emission is contained in the laser beam, the laser beam having bandwidth of less than 1 pm; and an optics module in the path of the laser beam and having one or more optical elements of the laser resonator therein, the optics module including a grid of inert gas flow inlets and an outlet for purging the optics module with an inert gas having a homogeneous flow distribution into the optics module.

53. The laser of claim 52, further comprising a heater coupled to the optics module for warming the optics module.

54. The laser of claim 53, further comprising a temperature controller for controlling the heater and thereby for controlling the temperature of the optics module.

55. The laser of claim 53, further comprising a cooling module coupled to the optics module for cooling the optics module.

56. The laser of claim 55, further comprising a temperature controller for controlling the heater and the cooling module and thereby for controlling the temperature of the optics module.

* * * * *